(12) United States Patent
Yogo et al.

(10) Patent No.: US 10,900,820 B2
(45) Date of Patent: Jan. 26, 2021

(54) AIR FLOW RATE MEASUREMENT DEVICE HAVING A SEGMENTED BOARD PORTION AT AN UPSTREAM SIDE TO SUPPRESS FLOW DISTURBANCES

(71) Applicant: HITACHI AUTOMOTIVE SYSTEMS, LTD., Hitachinaka (JP)

(72) Inventors: Takayuki Yogo, Hitachinaka (JP); Naoki Saito, Hitachinaka (JP); Hiroaki Hoshika, Hitachinaka (JP); Takahiro Miki, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/338,836

(22) PCT Filed: Sep. 26, 2017

(86) PCT No.: PCT/JP2017/034629
§ 371 (c)(1),
(2) Date: Apr. 2, 2019

(87) PCT Pub. No.: WO2018/100854
PCT Pub. Date: Jun. 7, 2018

(65) Prior Publication Data
US 2020/0049538 A1    Feb. 13, 2020

(30) Foreign Application Priority Data

Nov. 30, 2016  (JP) .................................. 2016-232569

(51) Int. Cl.
*G01F 1/68* (2006.01)
*G01F 1/684* (2006.01)
(52) U.S. Cl.
CPC ................................ *G01F 1/684* (2013.01)

(58) Field of Classification Search
None
See application file for complete search history.

(56) References Cited

U.S. PATENT DOCUMENTS 5,271,272 A * 12/1993 Hueftle .................... G01F 1/692
73/114.34
5,319,971 A *  6/1994 Osswald ................... G01P 5/10
73/204.26

(Continued)

FOREIGN PATENT DOCUMENTS

JP    2012-503172 A    2/2012
JP    2014-010026 A    1/2014
(Continued)

OTHER PUBLICATIONS

International Search Report with English translation and Written Opinion issued in corresponding application No. PCT/JP2017/034629 dated Nov. 28, 2017.

Primary Examiner — Harshad R Patel
(74) Attorney, Agent, or Firm — Foley & Lardner LLP

(57) ABSTRACT

An air flow rate measurement device capable of suppressing disturbance of a flow of measured gas and reducing a characteristic influence due to water droplets flowing with intake air is realized. An edge 800 of the upstream side where air flows in a circuit board 400 on which a flow rate detection portion 602 is mounted is provided with a segmentation portion 801 to be a semicircular notch structure to segment the edge 800. Water droplets flowing with measured gas 30 can be captured by the segmentation portion 801 to inhibit the water droplets from arriving at the flow rate detection portion 602.

11 Claims, 25 Drawing Sheets

(56) References Cited

U.S. PATENT DOCUMENTS

| | | | | |
|---|---|---|---|---|
| 5,372,040 | A | * | 12/1994 | Hecht .................... G01F 1/692 |
| | | | | 73/204.26 |
| 5,744,713 | A | * | 4/1998 | Wienand ................ G01F 1/692 |
| | | | | 439/630 |
| 6,170,327 | B1 | * | 1/2001 | Wildgen ............... G01F 1/6842 |
| | | | | 73/204.26 |
| 2007/0107511 | A1 | | 5/2007 | Strohrmann |
| 2009/0126477 | A1 | * | 5/2009 | Saito .................... G01F 1/6845 |
| | | | | 73/204.25 |
| 2012/0048005 | A1 | * | 3/2012 | Renninger .............. G01F 15/12 |
| | | | | 73/114.32 |
| 2016/0282162 | A1 | | 9/2016 | Tokuyasu |
| 2017/0211958 | A1 | | 7/2017 | Yogo |
| 2019/0170589 | A1 | * | 6/2019 | Yatsumonji ............ G01D 21/02 |

FOREIGN PATENT DOCUMENTS

| | | |
|---|---|---|
| JP | 2014-185868 A | 10/2014 |
| WO | WO2016/017300 A1 | 2/2016 |

\* cited by examiner

FIG. 15
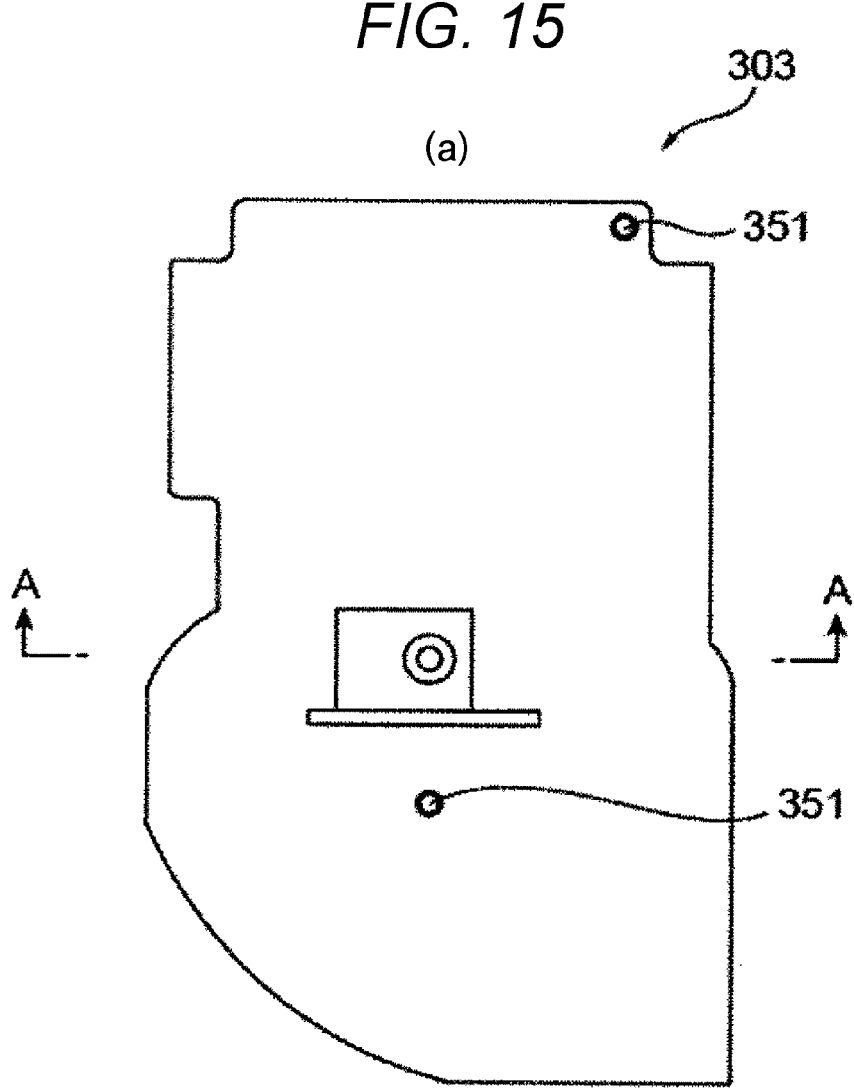
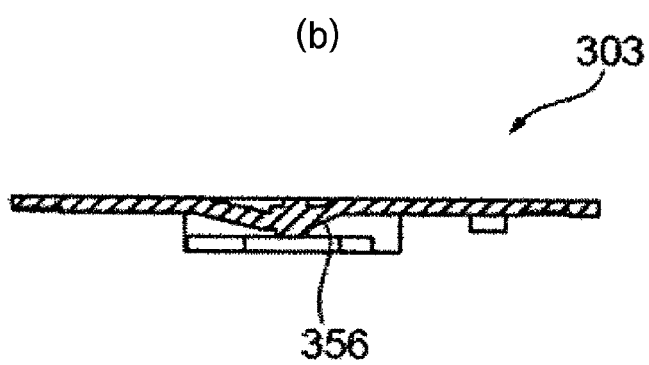

AIR FLOW RATE MEASUREMENT DEVICE HAVING A SEGMENTED BOARD PORTION AT AN UPSTREAM SIDE TO SUPPRESS FLOW DISTURBANCES

TECHNICAL FIELD

The present invention relates to an air flow rate measurement device.

BACKGROUND ART

An air flow rate measurement device for measuring a flow rate of air including contaminants such as intake air of an internal combustion engine is known.

PTL 1 describes a thermal type air flowmeter. In technology described in PTL 1, in order to prevent adhesion of contaminants to a flow rate detection portion, the flow rate detection portion is provided to be exposed to an exposure surface disposed along a flow direction of measured gas in a sub-passage, a step is formed in the exposure surface to surround the periphery of the flow rate detection portion, and an inner region surrounded by the step is configured to protrude more than an outer region of the step.

CITATION LIST

Patent Literature

PTL 1: JP 2014-185868 A

SUMMARY OF INVENTION

Technical Problem

The flow rate detection portion described in PTL 1 is surrounded by the step, thereby blocking contaminants such as oil mist including carbon in the outer region of the step to prevent adhesion of the contaminants.

However, in the technology described in PTL 1, the step is provided on a plane on which the flow rate detection portion is mounted. For this reason, the flow of the gas in the flow rate detection portion may be largely disturbed and noise for flow rate detection may be generated.

Although the contaminants can be blocked, the water droplets flowing with the intake air can arrive at the flow rate detection portion and flow rate detection accuracy may be lowered.

The present invention has been made in view of the above points and an object thereof is to realize an air flow rate measurement device capable of suppressing disturbance of a flow of measured gas and reducing a characteristic influence due to water droplets flowing with intake air.

Solution to Problem

To achieve the above object, the present invention is configured as follows.

An air flow rate measurement device includes a board which has a flow rate detection portion to detect a flow rate of measured gas; and a housing which is provided with a passage taking a part of the measured gas and fixes the board so that the flow rate detection portion is disposed in the passage. The board has a segmentation portion which is provided in an edge of the upstream side of a flow of the measured gas with respect to the flow rate detection portion and segments a part of the edge.

Advantageous Effects of Invention

According to the present invention, it is possible to suppress disturbance of a flow of measured gas and reduce a characteristic influence due to water droplets flowing with intake air and it is possible to realize an air flow rate measurement device of high measurement accuracy with a simple structure.

Further, other problems, configurations, and effects will become apparent from the following description of embodiments.

BRIEF DESCRIPTION OF DRAWINGS

FIG. 15 is a diagram showing an appearance of a front cover.

DESCRIPTION OF EMBODIMENTS

Figure 1:
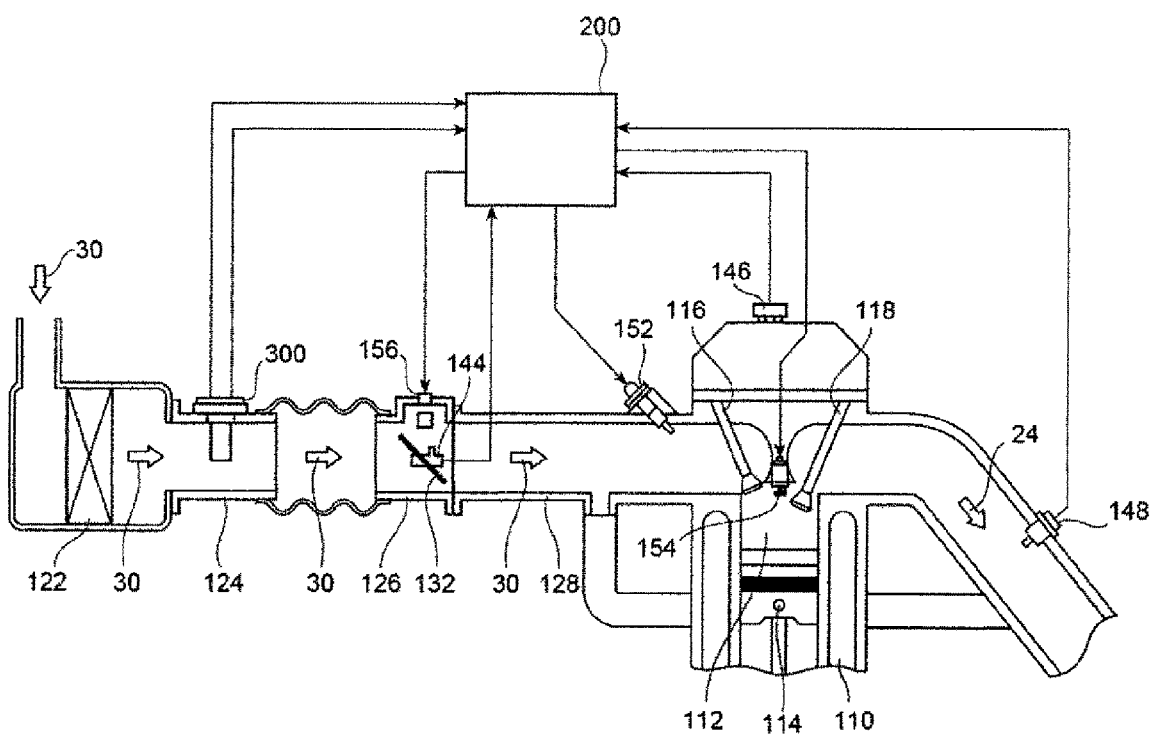
FIG. 1 is a schematic system diagram in which an embodiment of an air flow rate measurement device according to the present invention is applied to an internal combustion engine control system of an electronic fuel injection type.

Embodiments of the present invention will be described with reference to the drawings.

Embodiments of the present invention solve various problems demanded as actual products, and solve various problems desirable for use as a detection device for detecting a physical quantity of intake air of a vehicle in particular, and achieves various effects.

Embodiment

In the following embodiments, the same reference numerals denote the same configurations even if figure numbers are different from each other and achieve the same functions and effects. Further, with respect to configurations already described, only reference numerals may be attached in the figures and explanation thereof may be omitted.

1. Embodiment Using Air Flow Rate Measurement Device to be Physical Quantity Detection Device According to Present Invention in Internal Combustion Engine Control System FIG. 1 is a schematic system diagram in which an embodiment of an air flow rate measurement device according to the present invention is applied to an internal combustion engine control system of an electronic fuel injection type.

In FIG. 1, on the basis of an operation of an internal combustion engine 110 including an engine cylinder 112 and an engine piston 114, intake air is sucked as measured gas 30 from an air cleaner 122 and is guided to a combustion chamber of the engine cylinder 112 via a main passage 124, for example, an intake body, a throttle body 126, and an intake manifold 128.

A physical quantity of the measured gas 30 to be the intake air guided to the combustion chamber is detected by an air flow rate measurement device 300 according to an embodiment of the present invention and fuel is supplied from a fuel injection valve 152 on the basis of a detected air quantity (physical quantity) and is guided to the combustion chamber together with the intake air 30 in an air-fuel mixture state.

In the present embodiment, the fuel injection valve 152 is provided in an intake port of the internal combustion engine and the fuel injected into the intake port forms the air-fuel mixture together with the measured gas 30 to be the intake air, is guided to the combustion chamber via an intake valve 116, and is burned to generate mechanical energy.

The fuel and the air guided to the combustion chamber form a mixed state of the fuel and the air, and is explosively burned due to spark ignition of a spark plug 154 to generate mechanical energy. The gas after combustion is guided from an exhaust valve 118 to an exhaust pipe and is discharged as exhaust gas 24 from the exhaust pipe to the outside of a vehicle. A flow rate of the measured gas 30 to be the intake air guided to the combustion chamber is controlled by a throttle valve 132 of which an opening changes on the basis of an operation of an accelerator pedal of the vehicle. A fuel supply quantity is controlled on the basis of the flow rate of the intake air guided to the combustion chamber and a driver controls the opening of the throttle valve 132 to control the flow rate of the intake air guided to the combustion chamber, so that the mechanical energy generated by the internal combustion engine can be controlled.

1.1 Outline of Control of Internal Combustion Engine Control System

Physical quantities such as the flow rate, the temperature, the humidity, and the pressure of the measured gas 30 to be the intake air taken from the air cleaner 122 and flowing through the main passage 124 are detected by the air flow rate measurement 300 and an electrical signal representing the flow rate (physical quantity) of the intake air is input from the air flow rate measurement device 300 to a control device 200.

Further, an output of a throttle angle sensor 144 for measuring the opening of the throttle valve 132 is input to the control device 200 and an output of a rotation angle sensor 146 is input to the control device 200 to measure positions and states of the engine piston 114, the intake valve 116, and the exhaust valve 118 of the internal combustion engine and a rotation speed of the internal combustion engine. An output of an oxygen sensor 148 is input to the control device 200 to measure a state of the mixture ratio of the fuel quantity and the air quantity from the state of the exhaust gas 24.

The control device 200 calculates a fuel injection quantity and ignition timing, on the basis of the flow rate of the intake air to be the output of the air flow rate measurement device 300 and a rotation speed of the internal combustion engine measured on the basis of an output of the rotation angle sensor 146. The quantity of fuel supplied from the fuel injection valve 152 and the ignition timing ignited by the spark plug 154 are controlled on the basis of an operation result.

The fuel supply quantity and the ignition timing are actually controlled finely on the basis of the temperature detected by the air flow rate measurement device 300, a change state of a throttle angle, a change state of an engine rotation speed, and a state of an air-fuel ratio measured by the oxygen sensor 148. Further, in an idle operation state of the internal combustion engine, the control device 200 controls the quantity of air bypassing the throttle valve 132 by an idle air control valve 156 and controls the rotation speed of the internal combustion engine in the idle operation state.

1.2 Importance of Improvement of Detection Accuracy of Air Flow Rate Measurement Device and Mounting Environment of Air Flow Rate Measurement Device Both the fuel supply quantity and the ignition timing to be the main control quantities of the internal combustion engine are operated using the output of the air flow rate measurement device 300 as a main parameter. Therefore, improvement of detection accuracy of the air flow rate measurement device 300, suppression of a temporal change, and improvement of reliability are important for improving control accuracy of the vehicle and securing reliability.

Particularly, in recent years, the demand for fuel saving of vehicles is very high and the demand for purification of exhaust gas is very high. In order to meet these demands, it is extremely important to improve the detection accuracy of the flow rate of the intake air 20 detected by the air flow rate measurement device 300. Further, it is important for the air flow rate measurement device 300 to maintain high reliability.

A vehicle on which the air flow rate measurement device 300 is mounted is used in an environment where the change in the temperature or the humidity is large. Preferably, the air flow rate measurement device 300 takes measures to deal with the change in the temperature or the humidity in a use environment thereof or to deal with dust and contaminants.

Further, the air flow rate measurement device 300 is mounted to an intake pipe affected by heat generated from the internal combustion engine. Therefore, the heat generated from the internal combustion engine is transferred to the air flow rate measurement device 300 via the intake pipe to be the main passage 124. Since the air flow rate measurement 300 detects the flow rate of the measured gas by performing the heat transfer with the measured gas, it is important to maximally suppress an influence of the heat from the outside.

As described below, the air flow rate measurement device 300 mounted on a vehicle solves problems described merely in a section of Technical Problem and achieves effects described in a section of Advantageous Effects of Invention. In addition, as described below, the air flow rate measurement device 300 fully considers the various problems described above, solves various problems required as products, and achieves various effects.

Specific problems to be solved by the air flow rate measurement device 300 and specific effects achieved by the air flow rate measurement device 300 will be explained in the description of the following embodiments.

2. Configuration of Air Flow Rate Measurement Device 300

2.1 Appearance Structure of Air Flow Rate Measurement Device 300

Figure 2:
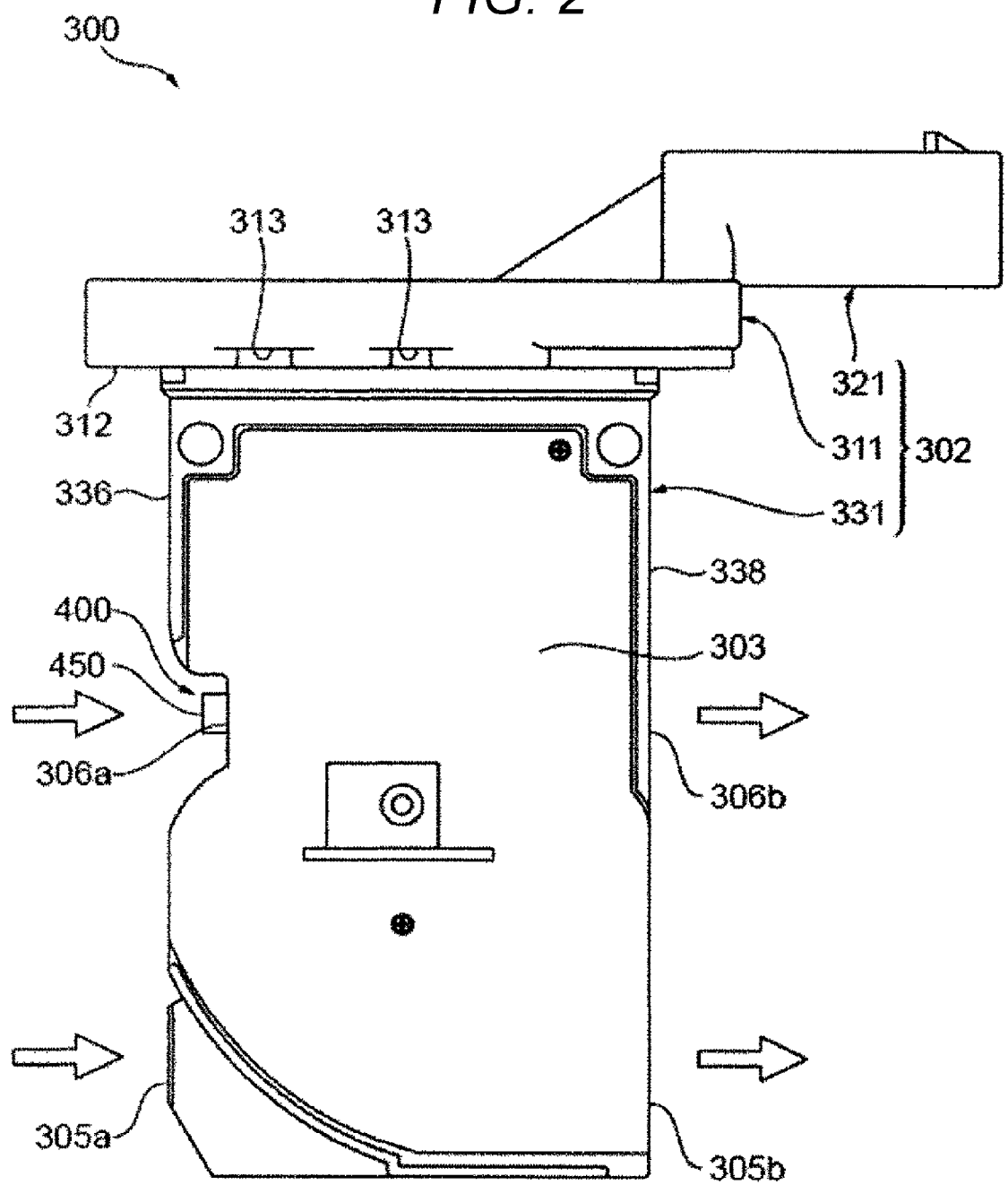
FIG. 2 is a front view of an air flow rate measurement device.
Figure 3:
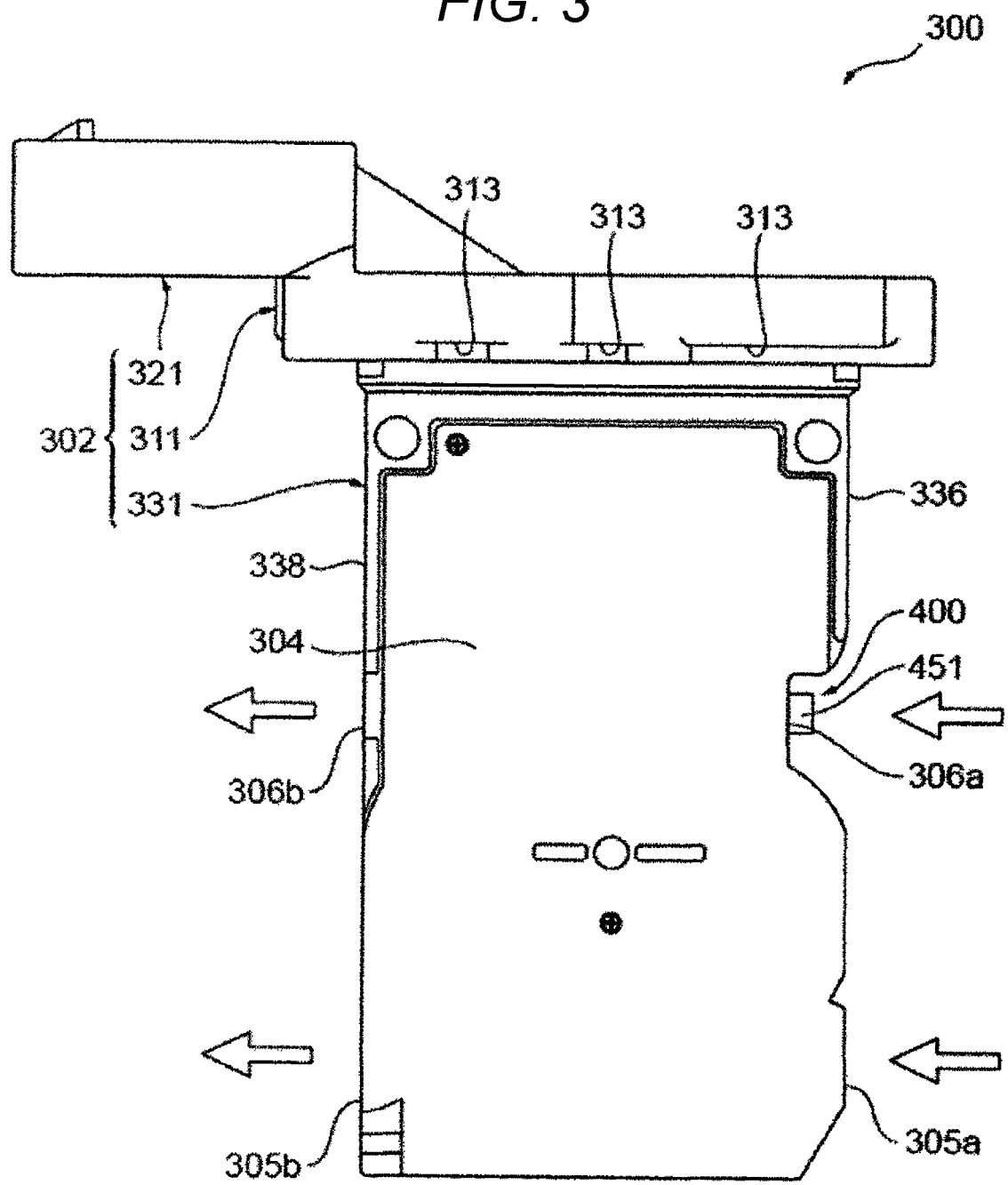
FIG. 3 is a rear view of an air flow rate measurement device.
Figure 4:
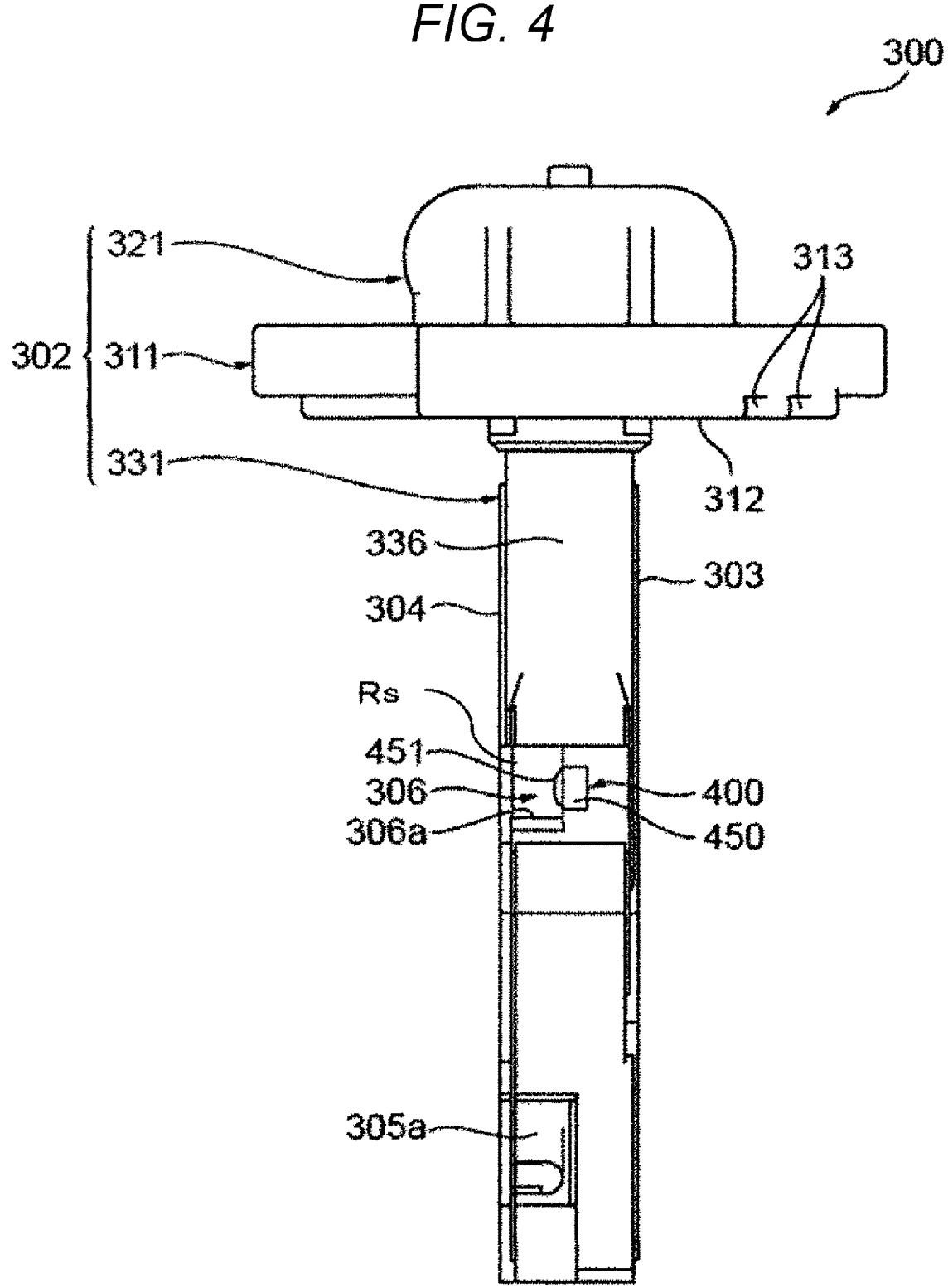
FIG. 4 is a left side view of an air flow rate measurement device.
Figure 5:
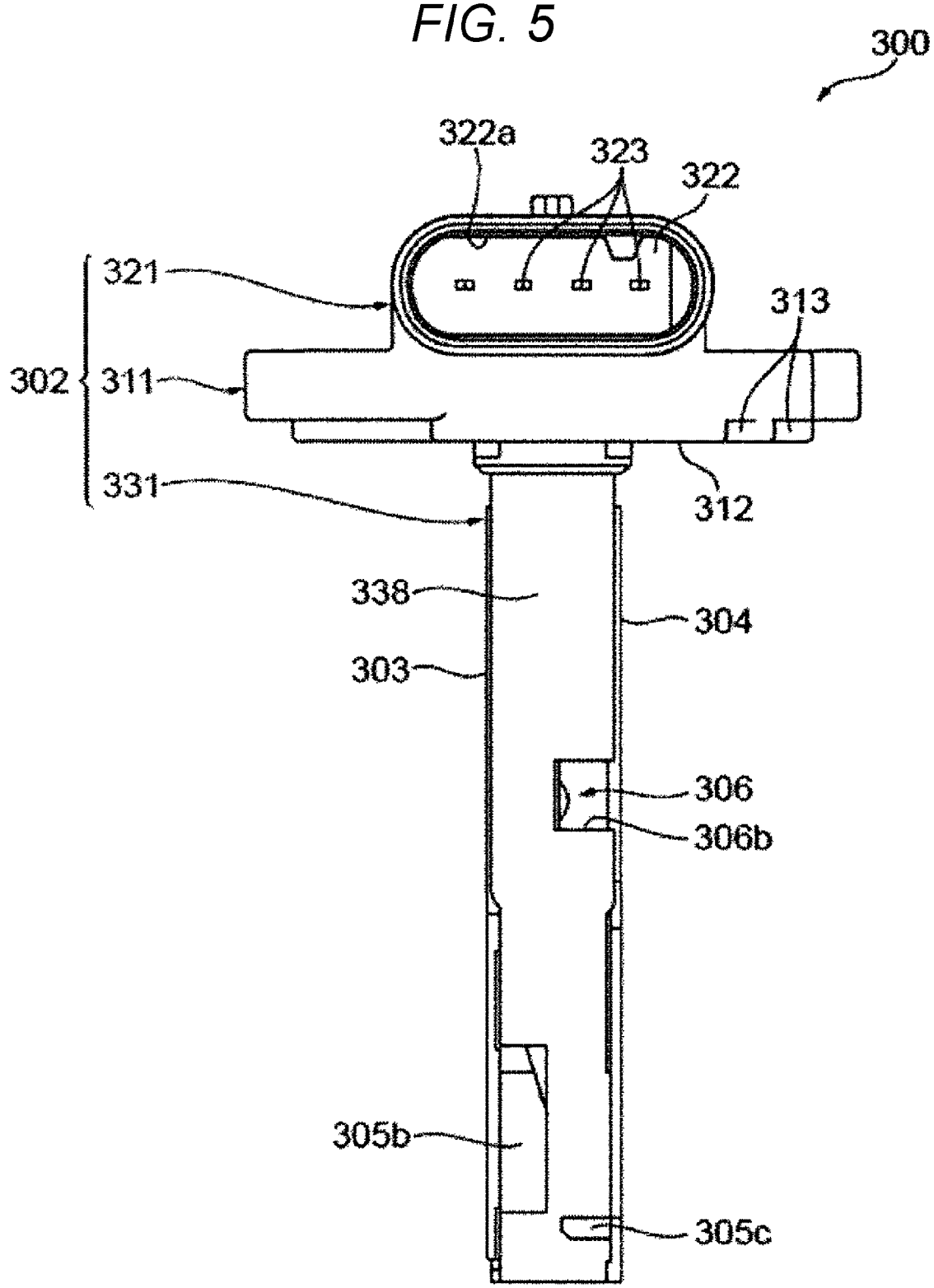
FIG. 5 is a right side view of an air flow rate measurement device.
Figure 6:
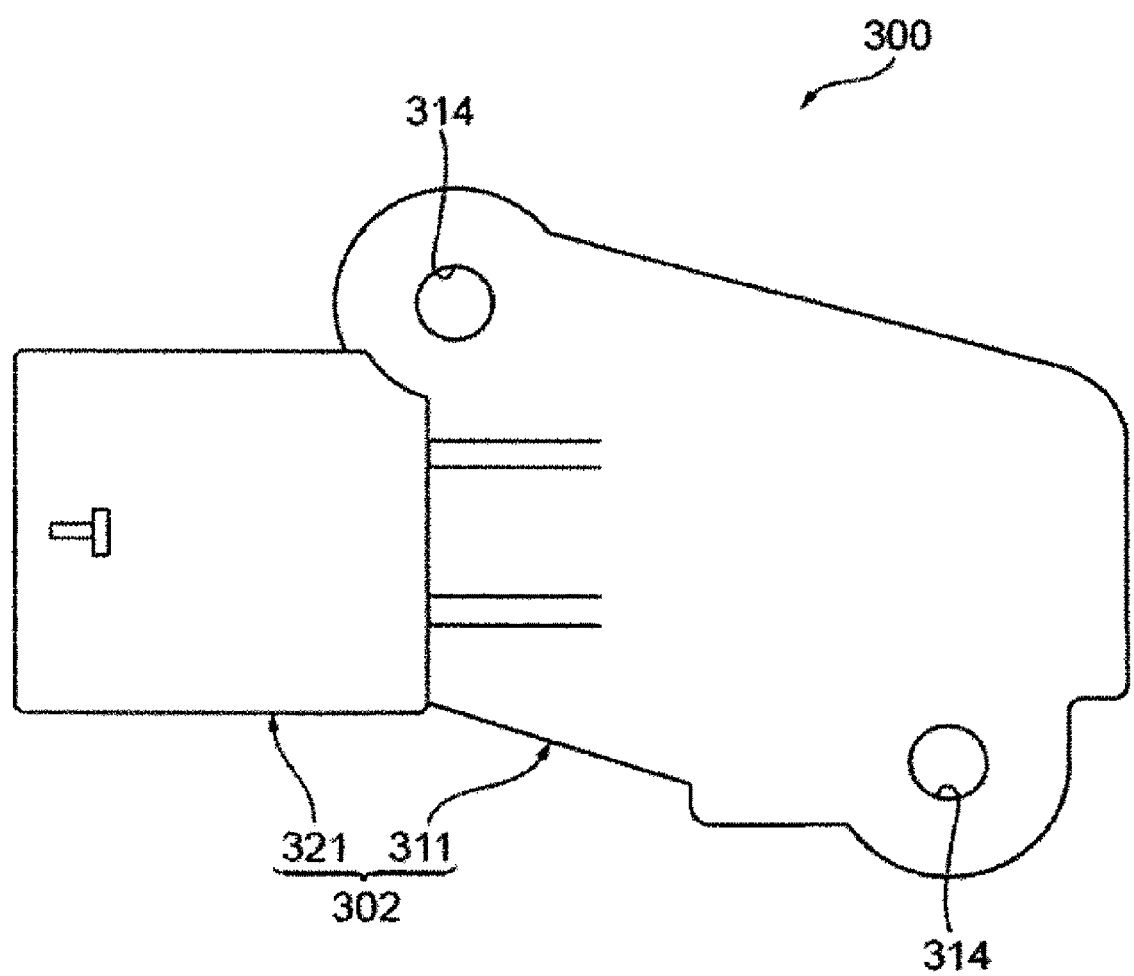
FIG. 6 is a plan view of an air flow rate measurement device.
Figure 7:
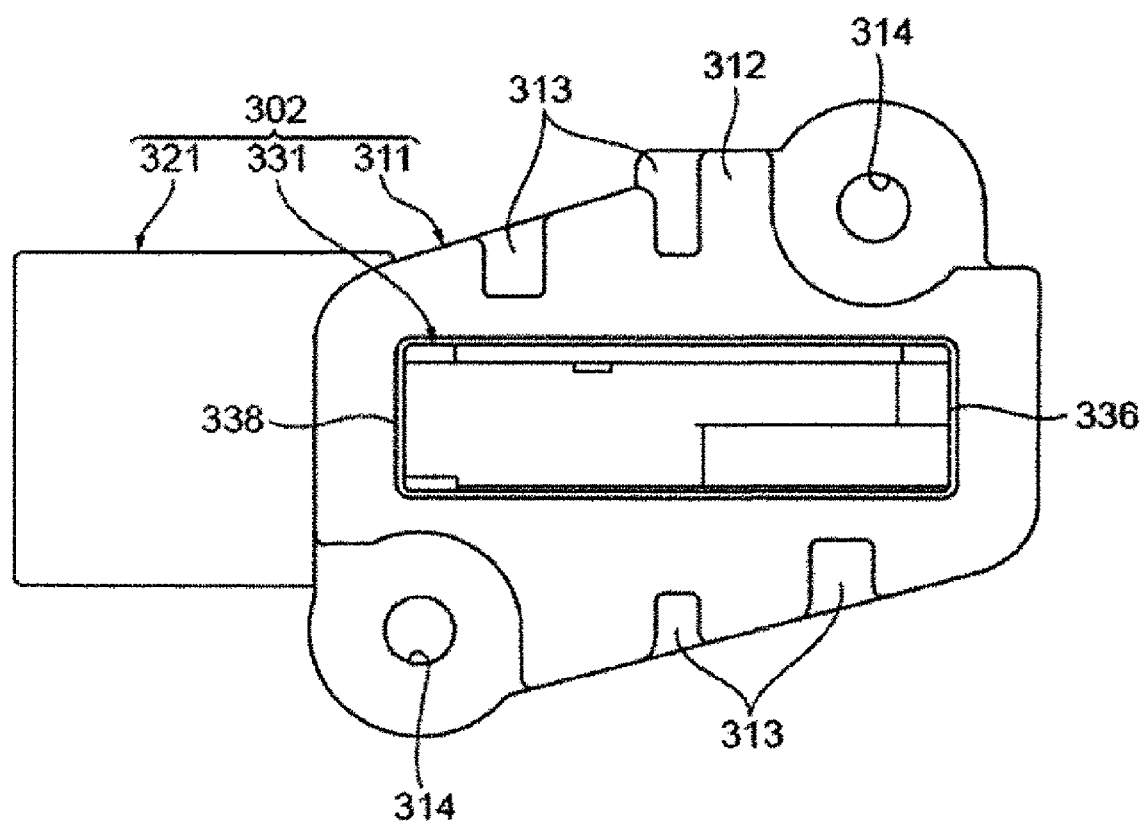
FIG. 7 is a bottom view of an air flow rate measurement device.

FIGS. 2 to 7 are diagrams showing an appearance of the air flow rate measurement device 300. FIG. 2 is a front view of the air flow rate measurement device 300. FIG. 3 is a rear view of the air flow rate measurement device 300. FIG. 4 is a left side view of the air flow rate measurement device 300. FIG. 5 is a right side view of the air flow rate measurement device 300. FIG. 6 is a plan view of the air flow rate measurement device 300. FIG. 7 is a bottom view of the air flow rate measurement device 300.

In FIGS. 2 to 7, the air flow rate measurement device 300 includes a housing 302, a front cover 303, and a rear cover 304. The housing 302 is formed by molding a synthetic resin material and has a flange 311 that fixes the air flow rate measurement device 300 to the intake body to be the main passage 124, an external connection portion 321 having a connector that protrudes from the flange 311 and performs electrical connection with an external apparatus, and a measurement portion 331 that extends to produce from the flange 311 to the center of the main passage 124.

Figure 8:
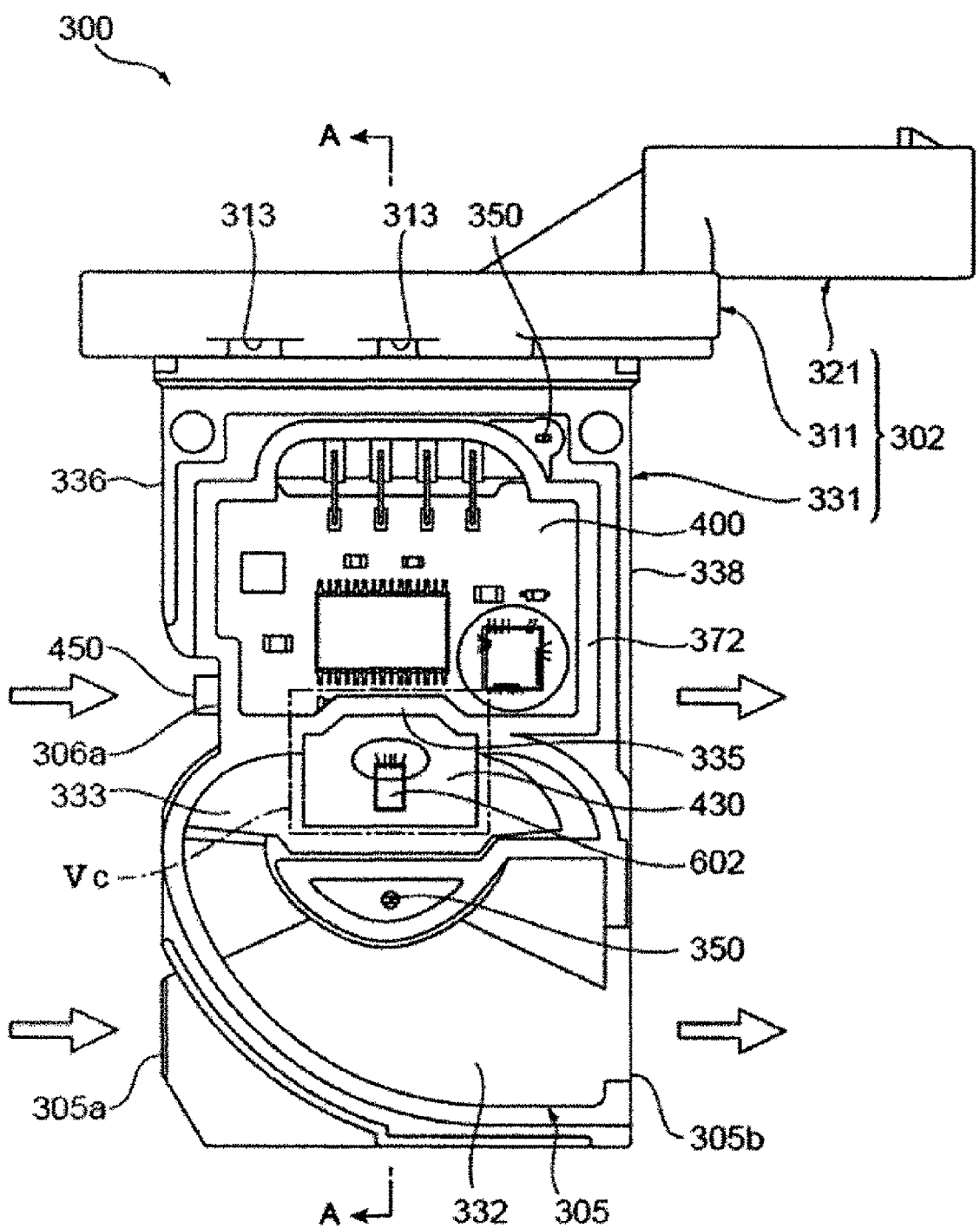
FIG. 8 is a front view of a state in which a front cover and a rear cover are removed from an air flow rate measurement device.
Figure 9:
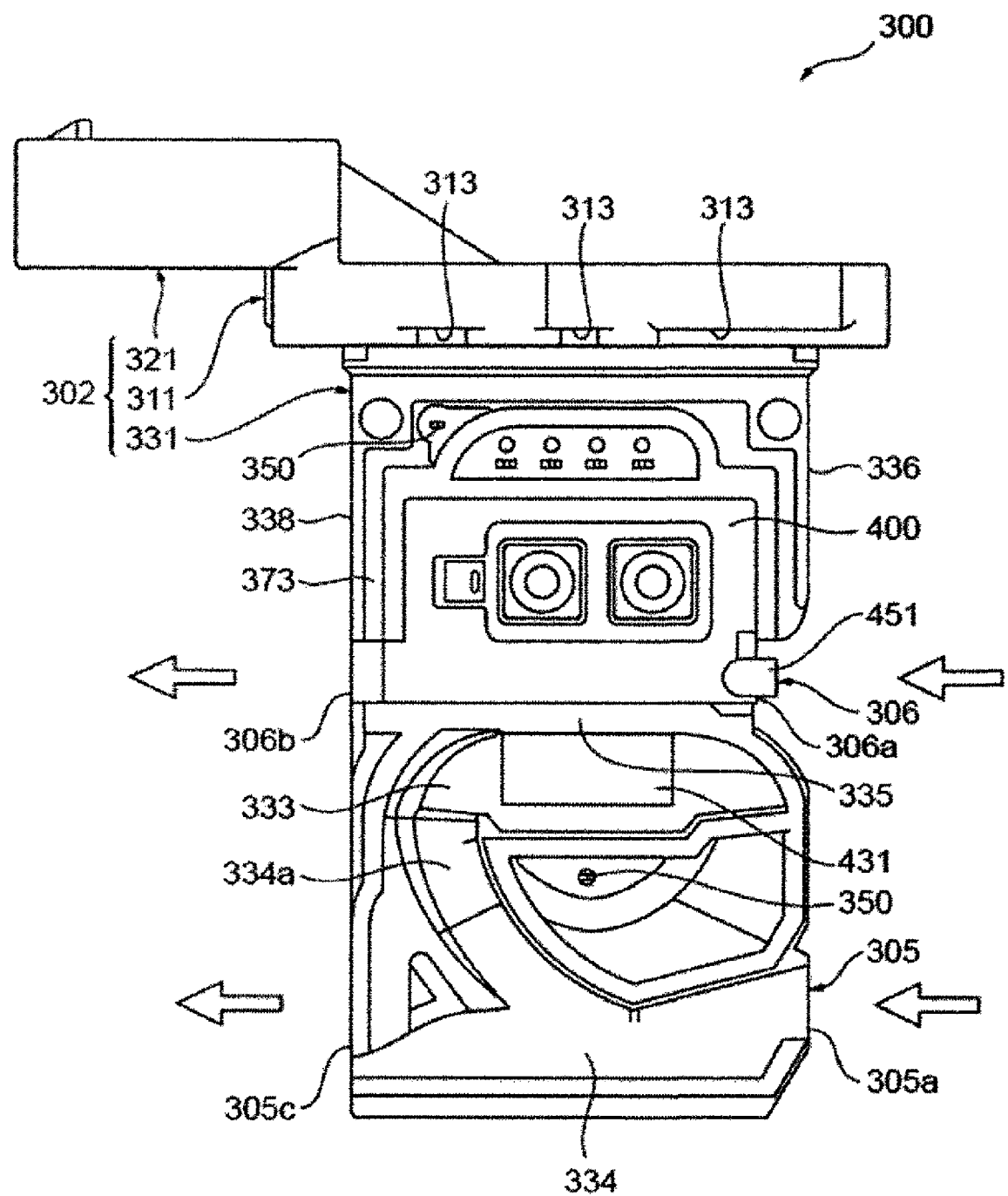
FIG. 9 is a rear view of a state in which a front cover and a rear cover are removed from an air flow rate measurement device.

The measurement portion 331 is integrally provided with a circuit board 400 by insert molding when the housing 302 is molded (refer to FIGS. 8 and 9). The circuit board 400 is provided with at least one detection portion for detecting the flow rate of the measured gas 30 flowing through the main passage 124 and a circuit portion for processing a signal detected by the detection portion. The detection portion is disposed at a position exposed to the measured gas 30 and the circuit portion is disposed in a circuit chamber sealed by the front cover 303.

A sub-passage groove is provided in a surface and a back surface of the measurement portion 331 and a first sub-passage 305 is formed in cooperation with the front cover 303 and the rear cover 304. A first sub-passage inlet 305a for taking a part of the measured gas 30 such as the intake air into the first sub-passage 305 and a first sub-passage outlet 305b for returning the measured gas 30 from the first sub-passage 305 to the main passage 124 are provided in a leading end portion of the measurement portion 331. A part of the circuit board 400 protrudes in the middle of the passage of the first sub-passage 305, a flow rate detection portion 602 (refer to FIG. 8) to be a detection portion is disposed in a protrusion portion, so that the flow rate of the measured gas 30 is detected.

A second sub-passage 306 for taking a part of the measured gas 30 such as the intake air to a sensor chamber Rs is provided in an intermediate portion of the measurement portion 331 closer to the flange 311 than the first sub-passage 305. The second sub-passage 306 is formed by cooperation of the measurement portion 331 and the rear cover 304. The second sub-passage 306 has a second sub-passage inlet 306a opened to an upstream side outer wall 336 for taking the measured gas 30 and a second sub-passage outlet 306b opened to a downstream side outer wall 338 for returning the measured gas 30 from the second sub-passage 306 to the main passage 124.

The second sub-passage 306 communicates with the sensor chamber Rs formed on the back surface side of the measurement portion 331. In the sensor chamber Rs, pressure sensors 421A and 421B and a humidity sensor 422 to be detection portions provided on the back surface of the circuit board 400 are disposed (refer to FIG. 19).

2.2 Effect Based on Appearance Structure of Air Flow Rate Measurement Device 300

In the air flow rate measurement device 300, the second sub-passage inlet 306a is provided in the intermediate portion of the measurement portion 331 extending in a center direction of the main passage 124 from the flange 311 and the first sub-passage inlet 305a is provided in the leading end portion of the measurement portion 331. Therefore, gas in a portion close to a center portion distant from an inner wall surface of the main passage 124, not in the vicinity of the inner wall surface, can be taken in the first sub-passage 305 and the second sub-passage 306.

Therefore, the air flow rate measurement device 300 can measure a physical quantity of the gas in the portion distant from the inner wall surface of the main passage 124 and can reduce measurement error of the air flow rate associated with a heat or a flow rate decrease near the inner wall surface.

The measurement portion 331 has a shape extending long along an axis from the outer wall of the main passage 124 to the center, but a thickness and a width decrease as shown in FIGS. 4 and 5. That is, the measurement portion 331 of the air flow rate measurement device 300 has a shape in which a width of a side surface is small and a front surface is substantially rectangular. As a result, the air flow rate measurement device 300 can include the first sub-passage 305 having a sufficient length and can suppress fluid resistance to a small value for the measured gas 30.

Therefore, the air flow rate measurement device 300 can suppress the fluid resistance to a small value and can measure the flow rate of the measured gas 30 with high accuracy.

2.3 Structure and Effect of Flange 311

The flange 311 has a plurality of recesses 313 provided on a bottom surface 312 facing the main passage 124 to reduce a heat transfer surface between the flange 311 and the main passage 124, thereby making it difficult for the air flow rate measurement device 300 to be affected by the heat. In the air flow rate measurement device 300, the measurement portion 331 is inserted into an inner portion from a mounting hole provided in the main passage 124 and the bottom surface 312 of the flange 311 faces the main passage 124.

The main passage 124 is, for example, the intake body and the main passage 124 is often maintained at a high temperature. Conversely, it is conceivable that the main passage 124 is at a very low temperature at the time of starting in a cold district. If such a high temperature or low temperature state of the main passage 124 affects measurements of various physical quantities, measurement accuracy is lowered.

The flange 311 has the recesses 313 provided on the bottom surface 312 and a space is formed between the bottom surface 312 facing the main passage 124 and the main passage 124. Therefore, it is possible to reduce the heat transfer from the main passage 124 to the air flow rate measurement device 300 and it is possible to prevent lowering of measurement accuracy due to the heat.

Screw holes 314 of the flange 311 are used for fixing the air flow rate measurement device 300 to the main passage 124 and a space is formed between a surface facing the main passage 124 around each screw hole 314 and the main passage 124 so that the surface facing the main passage 124 around the screw hole 314 is distant from the main passage 124. In this way, a structure in which it is possible to reduce the heat transfer from the main passage 124 to the air flow rate measurement device 300 and it is possible to prevent lowering of measurement accuracy due to the heat is realized.

2.4 Structure of External Connection Portion 321

The external connection portion 321 has a connector 322 that is provided on a top surface of the flange 311 and protrudes from the flange 311 to the downstream side of a flow direction of the measured gas 30. The connector 322 is provided with an insertion hole 322a for inserting a communication cable for connection with the control device 200. In the insertion hole 322a, four external terminals 323 are provided as shown in FIG. 5. The external terminals 323 become a terminal for outputting information of a physical quantity to be a measurement result of the air flow rate measurement device 300 and a power supply terminal for supplying direct-current power for operating the air flow rate measurement device 300.

The connector 322 has a shape in which it protrudes from the flange 311 to the downstream side of the flow direction of the measured gas 30 and is inserted from the downstream side of the flow direction to the upstream side. However, the present invention is not limited to the above shape. For example, the connector 322 may have a shape in which it protrudes vertically from the top surface of the flange 311 and is inserted along an extension direction of the measurement portion 331 and various changes can be made.

3. Entire Structure and Effect of Housing 302

3.1 Entire Structure

Figure 10:
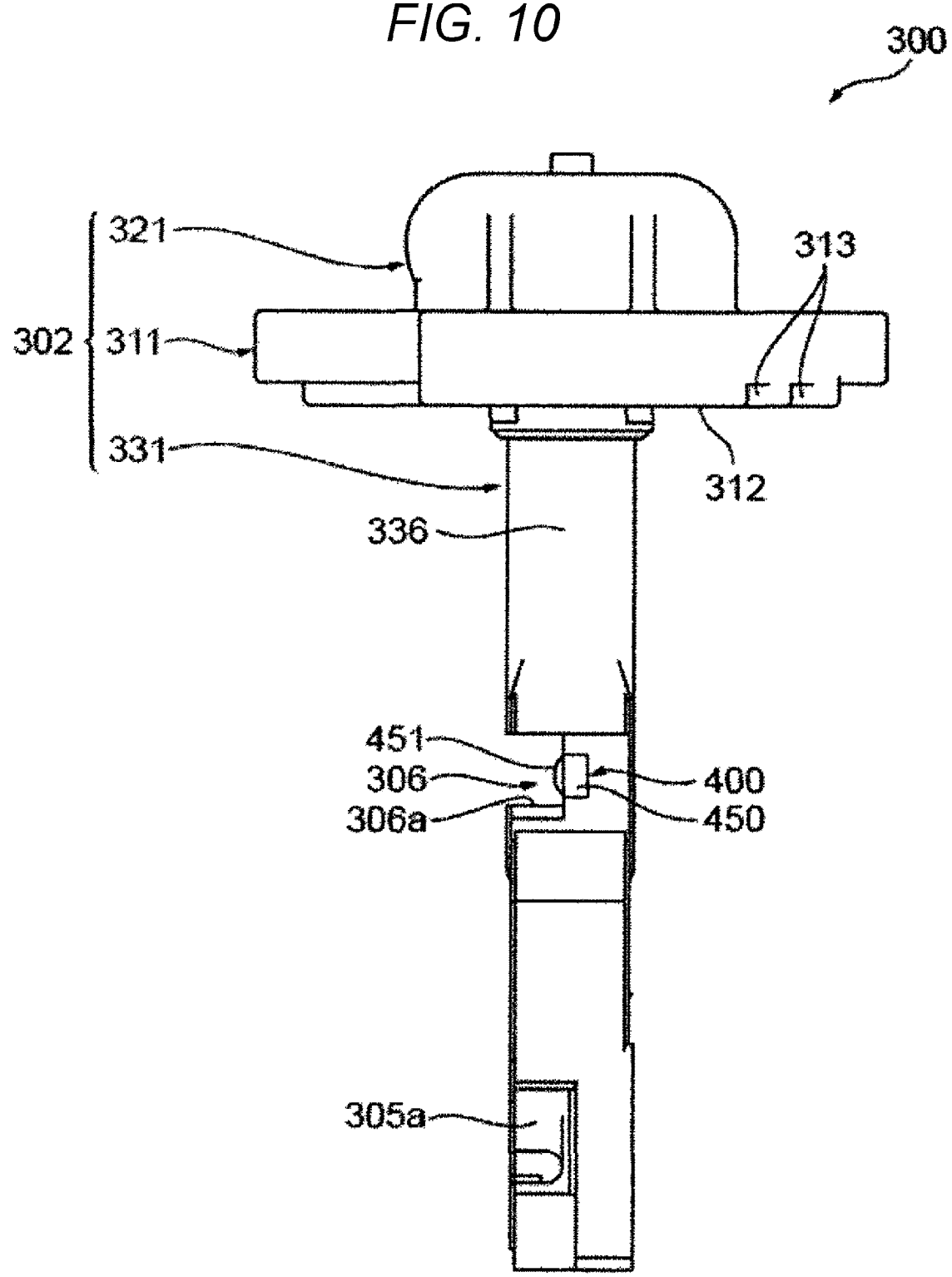
FIG. 10 is a left side view of a state in which a front cover and a rear cover are removed from an air flow rate measurement device.
Figure 11:
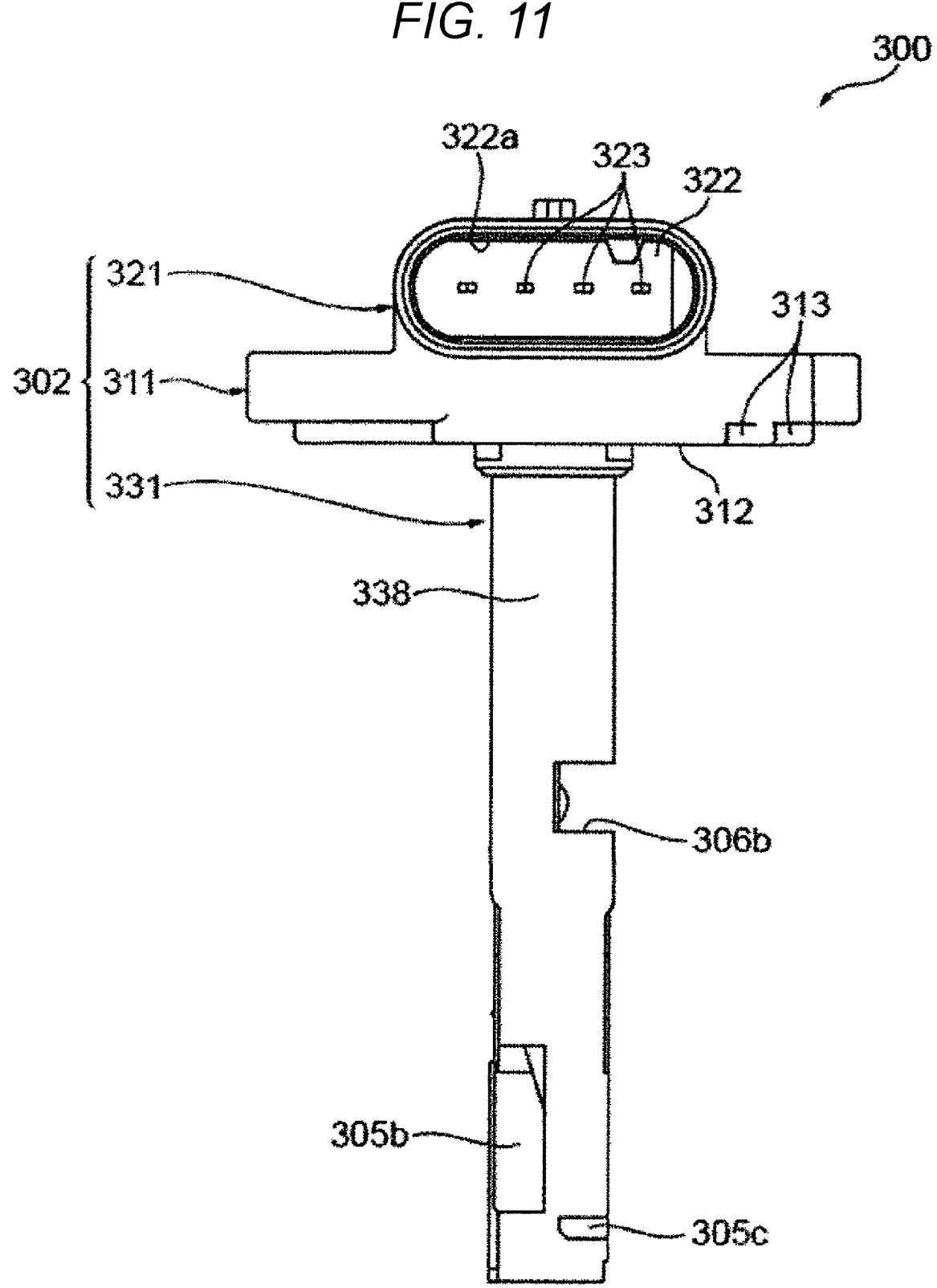
FIG. 11 is a right side view of a state in which a front cover and a rear cover are removed from an air flow rate measurement device.
Figure 12:
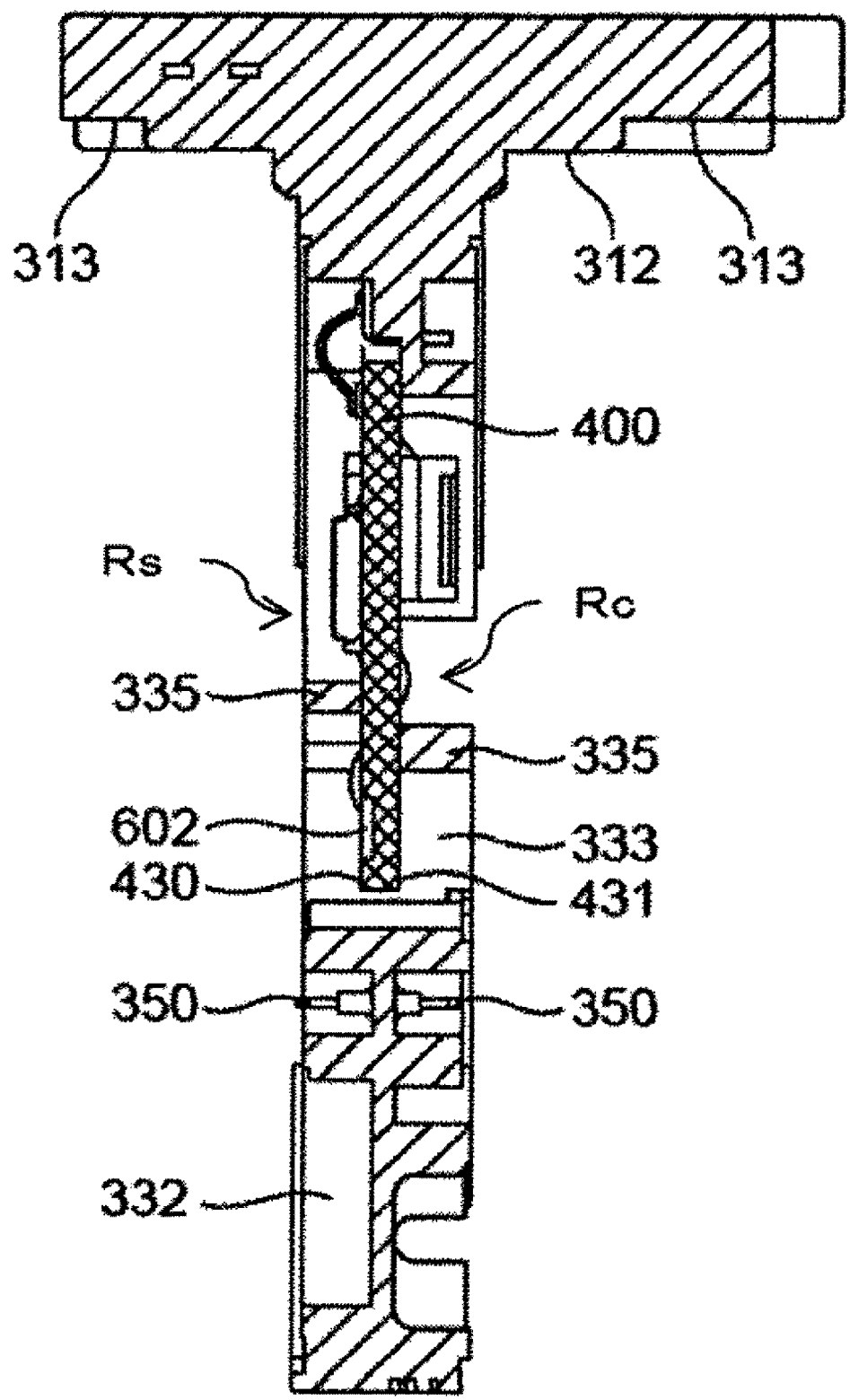
FIG. 12 is a cross-sectional view taken along the line A-A of FIG. 8.

Next, an entire structure of the housing 302 will be described using FIGS. 8 to 12. FIGS. 8 to 12 are diagrams showing a state of the housing 302 in which the front cover 303 and the rear cover 304 are removed from the air flow rate measurement device 300. FIG. 8 is a front view of the housing 302, FIG. 9 is a rear view of the housing 302, FIG. 10 is a right side view of the housing 302, FIG. 11 is a left side view of the housing 302, and FIG. 12 is a cross-sectional view taken along the line A-A of FIG. 8.

The housing 302 has a structure in which the measurement portion 331 extends from the flange 311 to the center of the main passage 124. The circuit board 400 is insert-molded on the base end side of the measurement portion 331. The circuit board 400 is disposed in parallel along the surface of the measurement portion 331 at an intermediate position between the surface and the back surface of the measurement portion 331 and molded integrally with the housing 302 and the base end side of the measurement portion 331 is partitioned into one side and the other side of a thickness direction.

A circuit chamber Rc for accommodating a circuit portion of the circuit board 400 is formed on the surface side of the measurement portion 331 and the sensor chamber Rs for accommodating the pressure sensor 421 and the humidity sensor 422 is formed on the back surface side. The circuit chamber Rc is sealed by mounting the front cover 303 to the housing 302 and is completely isolated from the outside. On the other hand, the rear cover 304 is mounted to the housing 302, so that the second sub-passage 306 and the sensor chamber Rs to be an indoor space communicating with the outside of the measurement portion 331 via the second sub-passage 306 are formed.

A part of the circuit board 400 protrudes from a partition wall 335 partitioning a portion between the circuit chamber Rc of the measurement portion 331 and the first sub-passage 305 to an inner portion of the first sub-passage 305 and the flow rate detection portion 602 is provided on a measurement flow passage surface 430 of a protrusion portion.

3.2 Structure of Sub-Passage Groove

A sub-passage groove for molding the first sub-passage 305 is provided on the leading end side of a longitudinal direction of the measurement portion 331. The sub-passage groove for forming the first sub-passage 305 has a front side sub-passage groove 332 shown in FIG. 8 and a rear side sub-passage groove 334 shown in FIG. 9. As shown in FIG. 8, the front side sub-passage groove 332 is gradually curved to the side of the flange 311 to be the base end side of the measurement portion 331 as it moves from the first sub-passage outlet 305b opened to the downstream side outer wall 338 of the measurement portion 331 to the upstream side outer wall 336 and communicates with an opening 333 penetrating the measurement portion 331 in the thickness direction at a position near the upstream side outer wall 336.

The opening 333 is formed along the flow direction of the measured gas 30 in the main passage 124 so as to extend between the upstream side outer wall 336 and the downstream side outer wall 338.

As shown in FIG. 9, the rear side sub-passage groove 334 moves from the upstream side outer wall 336 to the downstream side outer wall 338 and is divided into two parts at an intermediate position between the upstream side outer wall 336 and the downstream side outer wall 338. One of the two parts extends linearly as a discharge passage and is opened to a discharge port 305c of the downstream side outer wall 338 and the other is gradually curved to the side of the flange 311 to be the base end side of the measurement portion 331 as it moves to the downstream side outer wall 338 and communicates with the opening 333 at a position near the downstream side outer wall 338.

The rear side sub-passage groove 334 forms an inlet groove into which the measured gas 30 flows from the main passage 124 and the front side sub-passage groove 332 forms an outlet groove for returning the measured gas 30 taken from the rear side sub-passage groove 334 to the main passage 124. Since the front side sub-passage groove 332 and the rear side sub-passage groove 334 are provided in the leading end portion of the housing 302, the gas in the portion distant from the inner wall surface of the main passage 124, in other words, the gas flowing through the portion close to the center portion of the main passage 124 can be taken as the measured gas 30. The gas flowing in the vicinity of the inner wall surface of the main passage 124 is affected by a wall surface temperature of the main passage 124 and often has a temperature different from an average temperature of the gas flowing through the main passage 124 such as the intake air 20.

Further, the gas flowing in the vicinity of the inner wall surface of the main passage 124 often shows a flow rate lower than an average flow rate of the gas flowing through the main passage 124. In the physical quantity detection device 300 according to the embodiment, it is difficult to receive the above influence, so that it is possible to suppress lowering of measurement accuracy.

As shown in FIG. 9, a part of the measured gas 30 flowing through the main passage 124 is taken into the rear side sub-passage groove 334 from the first sub-passage inlet 305a and flows into the rear side sub-passage groove 334. In addition, a foreign material having a large mass, included in the measured gas 30, flows into the discharge passage linearly extending from a branch together with a part of the measured gas and is discharged from the discharge port 305c of the downstream side outer wall 338 to the main passage 124.

The rear side sub-passage groove 334 has a shape becoming deeper as it moves forward and the measured gas 30 gradually moves to the front side of the measurement portion 331 as it flows along the rear side sub-passage groove 334. Particularly, the rear side sub-passage groove 334 is provided with a steep inclination portion 334a to be rapidly deepened in front of the opening 333 and a part of air having a small mass moves along the steep inclination portion 334a and flows into the side of the measurement flow passage surface 430 of the circuit board 400 in the opening 333. On the other hand, the foreign material having a large mass flows into the side of a measurement flow passage back surface 431, because it is difficult to change the course rapidly.

As shown in FIG. 8, the measured gas 30 moved to the front side at the opening 333 flows along the measurement flow passage surface 430 of the circuit board 400, the heat transfer is performed with the flow rate detection portion 602 provided in the measurement flow passage surface 430, and the flow rate is measured. The air flowing from the opening 333 to the front side sub-passage groove 332 flows along the front side sub-passage groove 332 and is discharged from the first sub-passage outlet 305b opened to the downstream side outer wall 338 to the main passage 124.

Because a material having a large mass such as dust mixed in the measured gas 30 has a large inertial force, it is difficult to rapidly change the course in a depth direction of the groove along a surface of the portion of the steep inclination portion 334a (shown in FIG. 9) where the groove is rapidly deepened. For this reason, the foreign material having a large mass moves to the side of the measurement flow passage back surface 431 and it is possible to inhibit the foreign material from passing the vicinity of the flow rate detection portion 602. In the present embodiment, because many foreign materials having a large mass other than the gas are configured to pass through the measurement flow passage back surface 431 to be the back surface of the measurement flow passage surface 430, it is possible to reduce an influence of contamination due to foreign materials such as oil, carbon, and dust and it is possible to suppress lowering of measurement accuracy.

That is, since it has a shape for rapidly changing the course of the measured gas 30 along an axis crossing a flow axis of the main passage 124, it is possible to reduce the influence of the foreign material mixed in the measured gas 30.

3.3 Structures and Effects of Second Sub-Passage and Sensor Chamber

The second sub-passage 306 is formed linearly between the second sub-passage inlet 306a and the second sub-passage outlet 306b in parallel to the flange 311 so as to be along the flow direction of the measured gas 30. The second sub-passage inlet 306a is formed by cutting a part of the upstream side outer wall 336 and the second sub-passage outlet 306b is formed by cutting a part of the downstream side outer wall 338.

Specifically, as shown in FIGS. 9 and 10, the second sub-passage inlet 306a and the second sub-passage outlet 306b are formed by cutting a part of the upstream side outer wall 336 and a part of the downstream side outer wall 338 from the back surface side of the measurement portion 331 at positions continuously along a top surface of the partition wall 335. The second sub-passage inlet 306a and the second sub-passage outlet 306b are cut to depth positions to be flush with the back surface of the circuit board 400. Because the measured gas 30 passes through the second sub-passage 306 along a back surface of a board body 401 (shown in FIG. 19) of the circuit board 400, the second sub-passage 306 functions as a cooling channel for cooling the board body 401. Many circuit boards 400 have the heat from LSIs or microcomputers and transfer the heat to the back surface of the board body 401, thereby radiating the heat by the measured gas 30 passing through the second sub-passage 306.

The sensor chamber Rs is provided closer to the base end side of the measurement portion 331 than the second sub-passage 306. A part of the measured gas 30 flowing to the second sub-passage 306 from the second sub-passage inlet 306a flows to the sensor chamber Rs and the pressure and the relative humidity are detected by the pressure sensor 421 and the humidity sensor 422 in the sensor chamber Rs, respectively. Since the sensor chamber Rs is disposed closer to the base end side of the measurement portion 331 than the second sub-passage 306, it is possible to reduce an influence of a dynamic pressure of the measured gas 30 passing through the second sub-passage 306. Therefore, detection accuracy of the pressure sensor 421 in the sensor chamber Rs can be improved.

The sensor chamber Rs is disposed closer to the base end side of the measurement portion 331 than the second sub-passage 306. Therefore, for example, when the leading end side of the measurement portion 331 is mounted to the intake passage in a posture state where it faces downward, contaminants and water droplets flowing into the second sub-passage 306 together with the measured gas 30 can be inhibited from adhering to the pressure sensor 421 and the humidity sensor 422 disposed on the downstream side thereof.

Particularly, in the present embodiment, in the sensor chamber Rs, the pressure sensor 421 having a relatively large external shape is disposed on the upstream side and the humidity sensor 422 having a relatively small external shape is disposed on the downstream side of the pressure sensor 421. Therefore, the contaminants and the water droplets flowing together with the measured gas 30 adhere to the pressure sensor 421 and are inhibited from adhering to the humidity sensor 422. Accordingly, it is possible to protect the humidity sensor 422 having low resistance to the contaminants and the water droplets.

The pressure sensor 421 (421A and 421B) and the humidity sensor 422 are hardly affected by the flow of the measured gas 30 as compared with the flow rate detection portion 602. Particularly, the humidity sensor 422 may secure only a diffusion level of moisture in the measured gas 30, so that the humidity sensor 422 can be provided in the sensor chamber Rs adjacent to the second sub-passage 306 having a linear shape. On the other hand, the flow rate detection portion 602 requires a constant flow rate or more and it is necessary to keep the dust and the contaminants away and to consider an influence on pulsation. Therefore, the flow rate detection portion 602 is provided in the first sub-passage 305 having a loop shape.

Figure 13:
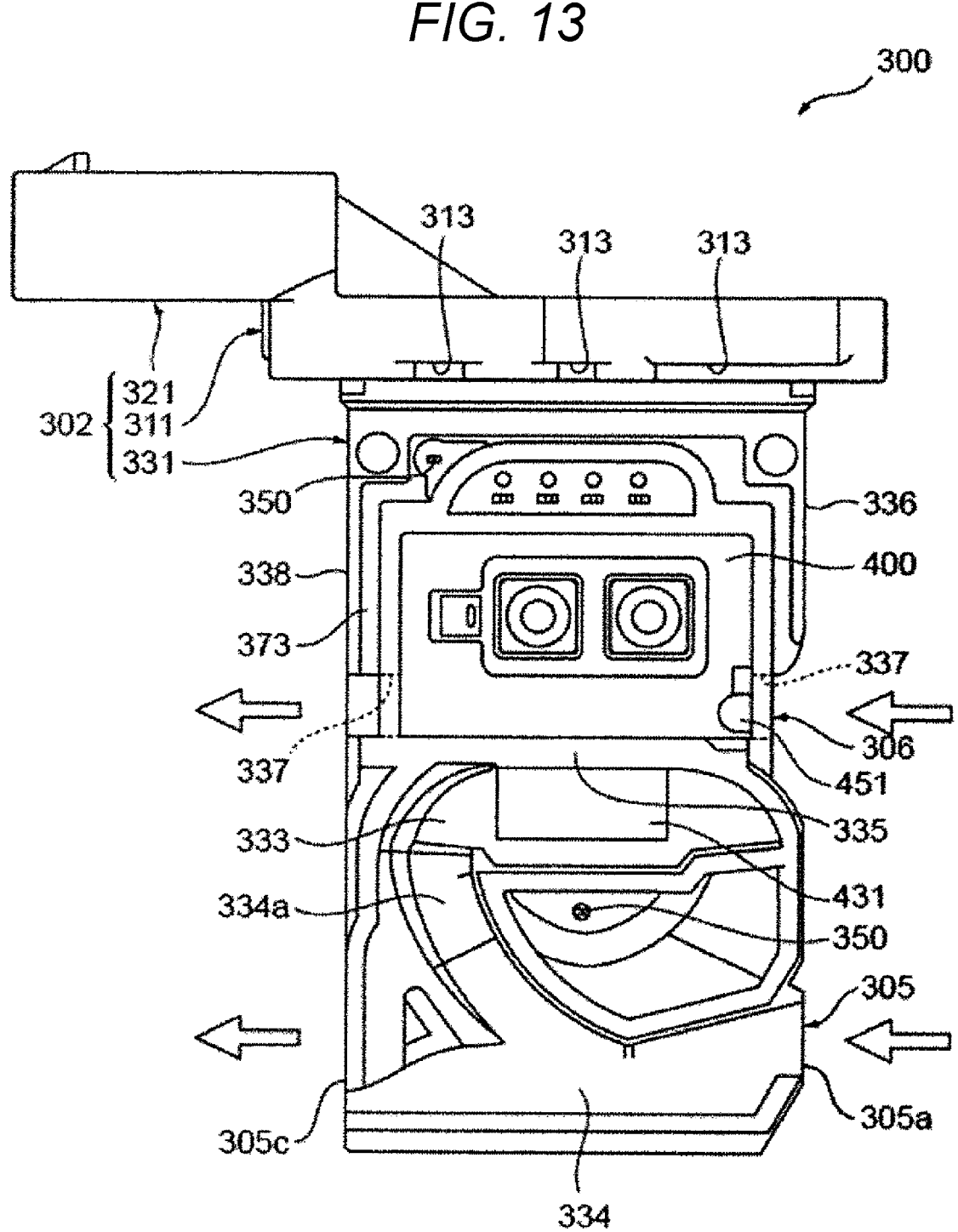
FIG. 13 is a diagram showing another form of a second sub-passage.
Figure 14:
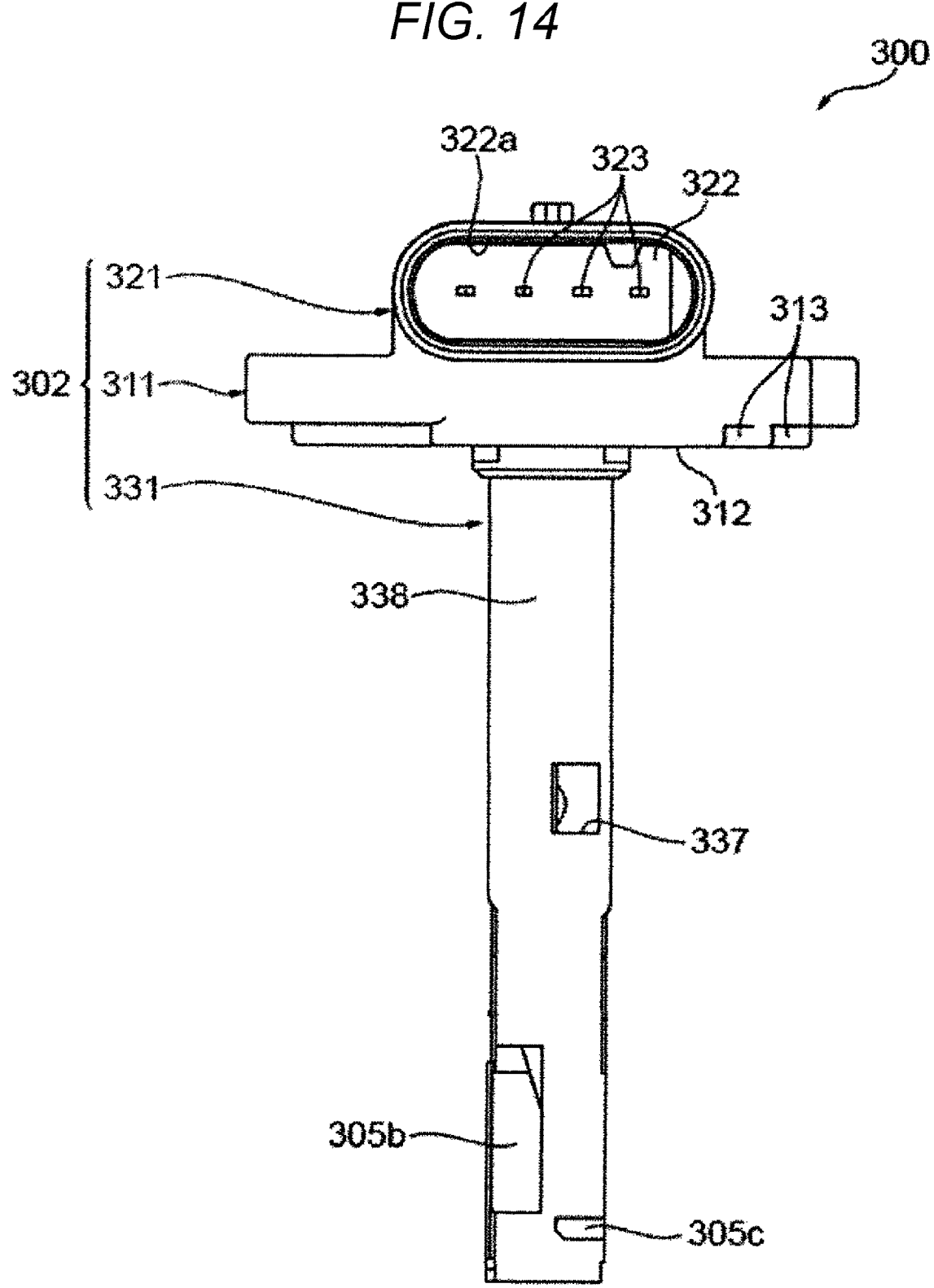
FIG. 14 is a diagram showing another form of a second sub-passage.

FIGS. 13 and 14 are diagrams showing another form of the second sub-passage.

In this form, by providing through-holes 337 in the upstream side outer wall 336 and the downstream side outer wall 338 instead of cutting the upstream side outer wall 336 and the downstream side outer wall 338, the second sub-passage inlet 306a and the second sub-passage outlet 306b are formed. If the second sub-passage inlet 306a and the second sub-passage outlet 306b are formed by notching the upstream side outer wall 336 and the downstream side outer wall 338 like the second sub-passage shown in FIGS. 9 to 12, the width of the upstream side outer wall 336 and the width of the downstream side outer wall 338 are locally decreased at the corresponding positions, so that the measurement portion 331 may be distorted in a substantially V shape with the notch as a starting point due to heat shrinkage or the like at the time of molding. According to this form, since the through-hole is provided instead of the notch, it is possible to prevent the measurement portion 331 from being bent in a substantially V shape.

Therefore, it is possible to prevent detection accuracy from being affected by a change in the position or the direction of the detection portion with respect to the measured gas 30 due to the distortion in the housing 302, so that there is no individual difference and constant detection accuracy can always be secured.

3.4 Shapes and Effects of Front Cover 303 and Rear Cover 304

Figure 16:
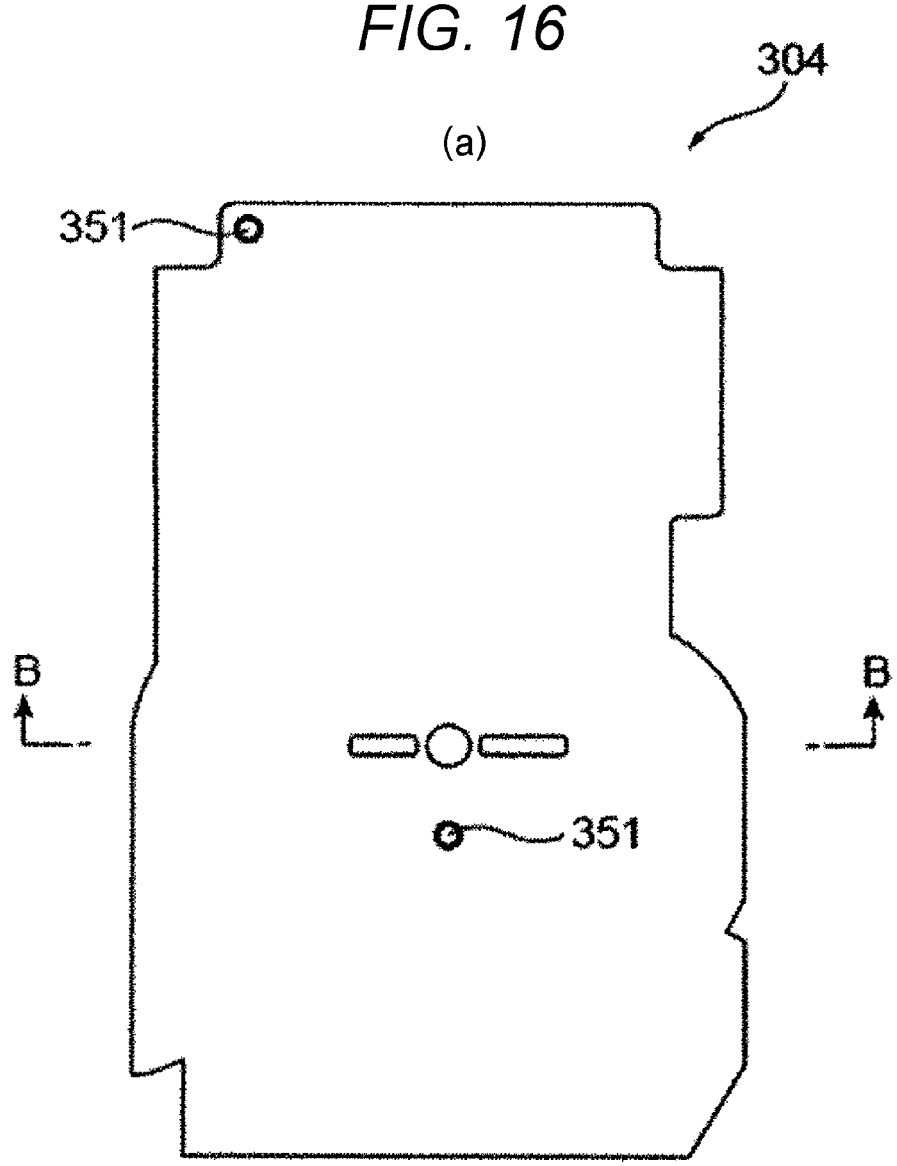
FIG. 16 is a diagram showing an appearance of a rear cover.

FIG. 15 is a diagram showing an appearance of the front cover 303. FIG. 15(a) is a front view and FIG. 15(b) is a cross-sectional view taken along the line B-B of FIG. 15(a). FIG. 16 is a diagram showing an appearance of the rear cover 304. FIG. 16(a) is a front view and FIG. 16(b) is a cross-sectional view taken along the line B-B of FIG. 16(a).

In FIGS. 15 and 16, the front cover 303 and the rear cover 304 close the front side sub-passage groove 332 and the rear side sub-passage 334 of the housing 302, thereby forming the first sub-passage 305. Further, the front cover 303 forms the sealed circuit chamber Rc and the rear cover 304 closes a concave portion of the back surface side of the measurement portion 331 to form the second sub-passage 306 and the sensor chamber Rs communicating with the second sub-passage 306.

As shown in FIG. 15(b), the front cover 303 includes a projection portion 356 at a position facing the flow rate detection portion 602 to be used to form a diaphragm between the front cover 303 and the measurement flow passage surface 430 shown in FIG. 8. Therefore, molding accuracy is preferably high. Since the front cover 303 and the rear cover 304 are manufactured by a resin molding process of injecting a thermoplastic resin into a mold, they can be manufactured with high molding accuracy.

The front cover 303 and the rear cover 304 are provided with a plurality of fixing holes 351 into which a plurality of fixing pins 350 (shown in FIGS. 8 and 9) protruding from the measurement portion 331 are respectively inserted. The front cover 303 and the rear cover 304 are respectively mounted to the surface and the back surface of the measurement portion 331. At this time, the fixing pins 350 are inserted into the fixing holes 351 and positioning is performed.

In addition, joining is performed by laser welding or the like along edges of the front side sub-passage groove 332 and the rear side sub-passage groove 334. Likewise, joining is performed by laser welding or the like along edges of the circuit chamber Rc and the sensor chamber Rs.

3.5 Fixing Structure and Effect by Housing 302 of Circuit Board 400

Next, fixing of the circuit board 400 to the housing 302 by the resin molding process will be described. The circuit board 400 is molded integrally with the housing 302 so that the flow rate detection portion 602 of the circuit board 400 is disposed in a predetermined place of the sub-passage groove forming the sub-passage, for example, in the opening 333 to be a connection portion between the front side sub-passage groove 332 and the rear side sub-passage groove 334 in the present embodiment.

In the measurement portion 331 of the housing 302, portions for embedding an outer circumferential edge portion of a base portion 402 of the circuit board 400 in the housing 302 by resin molding and fixing it are provided as fixing portions 372 and 373 (FIGS. 8 and 9). The fixing portions 372 and 373 sandwich the outer circumferential edge portion of the base portion 402 of the circuit board 400 from the front side and the rear side and fix it.

The housing 302 is manufactured by the resin molding process. In the resin molding process, the circuit board 400 is built in the resin of the housing 302 and fixed to an inner portion of the housing 302 by resin molding. In this way, a position relation or a direction relation to be a relation with the shape of the sub-passage for measuring the flow rate by performing heat transfer with the measured gas 30 by the flow rate detection portion 602, for example, the front side sub-passage groove 332 or the rear side sub-passage groove 334 can be maintained with extremely high accuracy and errors or variations occurring in each circuit board 400 can be suppressed to a very small value. As a result, measurement accuracy of the circuit board 400 can be greatly improved. For example, the measurement accuracy can be dramatically improved as compared with a conventional fixing method using an adhesive.

The air flow rate measurement device 300 is often produced by mass production and there is a limit to improving measurement accuracy in a method of performing bonding with the adhesive while strictly performing measurement here. However, as in the present embodiment, by fixing the circuit board 400 at the same time as forming the sub-passage by the resin molding process of forming the sub-passage for flowing the measured gas 30, it is possible to greatly reduce variations in the measurement accuracy and it is possible to greatly improve the measurement accuracy of the air flow rate measurement device 300.

For example, if the example shown in FIGS. 8 to 12 is further described, the circuit board 400 can be fixed to the housing 302 with high accuracy so that a relation between the front side sub-passage groove 332, the rear side sub-passage groove 334, and the flow rate detection portion 602 becomes a prescribed relation.

As a result, in each air flow rate measurement device 300 to be mass-produced, the position relation or the shape relation between the flow rate detection portion 602 of each circuit board 400 and the first sub-passage 305 can be constantly obtained with very high accuracy.

In the first sub-passage 305 in which the flow rate detection portion 602 of the circuit board 400 is fixedly disposed, for example, the front side sub-passage groove 332 and the rear side sub-passage groove 334 can be molded with very high precision. Therefore, the work for forming the first sub-passage 305 from these sub-passage grooves 332 and 334 is the work for covering both surfaces of the housing 302 with the front cover 303 and the rear cover 304. This work is very simple and it is a work process with few factors to lower measurement accuracy. Further, the front cover 303 and the rear cover 304 are produced by the resin molding process with high molding accuracy. Therefore, the sub-passage provided in a prescribed relation with the flow rate detection portion 602 of the circuit board 400 can be finished with high accuracy. By such a method, in addition to improvement of measurement accuracy, high productivity can be obtained.

On the other hand, conventional technology produces a thermal type flowmeter by manufacturing a sub-passage and adhering a measurement portion to the sub-passage with an adhesive. In a method of using the adhesive as described above, a thickness variation of the adhesive is large and a bonding position or a bonding angle varies for each product. Therefore, there is a limit to improving measurement accuracy. Further, when the above work is performed in a mass production process, it is very difficult to improve the measurement accuracy.

In the embodiment according to the present invention, the circuit board 400 is fixed by resin molding and at the same time, the sub-passage groove for molding the first sub-passage 305 is formed by the resin molding. In this way, the flow rate detection portion 602 can be fixed to the shape of the sub-passage groove and the sub-passage groove with extremely high accuracy.

The portion associated with measurement of the flow rate, for example, the flow rate detection portion 602 or the measurement flow passage surface 430 (FIG. 8) to which the flow rate detection portion 602 is mounted is provided on the surface of the circuit board 400. The flow rate detection portion 602 and the measurement flow passage surface 430 are exposed from the resin for forming the housing 302. That is, the flow rate detection portion 602 and the measurement flow passage surface 430 are not covered with the resin for forming the housing 302. The flow rate detection portion 602 or the measurement flow passage surface 430 of the circuit board 400 is used as it is even after the resin molding of the housing 302 and is used for the flow rate measurement of the air flow rate measurement device 300. In this way, the measurement accuracy is improved.

In the embodiment according to the present invention, since the circuit board 400 is fixed to the housing 302 having the first sub-passage 305 by integrally molding the circuit board 400 on the housing 302, the circuit board 400 can be surely fixed to the housing 302. In particular, since a protrusion portion 403 of the circuit board 400 penetrates the partition wall 335 and protrudes to the first sub-passage 305, a sealing property between the first sub-passage 305 and the circuit chamber Rc is high and it is possible to prevent the measured gas 30 from leaking into the circuit chamber Rc from the first sub-passage 305 and to prevent circuit components or wiring lines of the circuit board 400 from contacting the measured gas 30 and corroding.

4. Appearance of Circuit Board 400

4.1 Molding of Measurement Flow Passage Surface 430 Including Flow Rate Detection Portion 602

Figure 17:
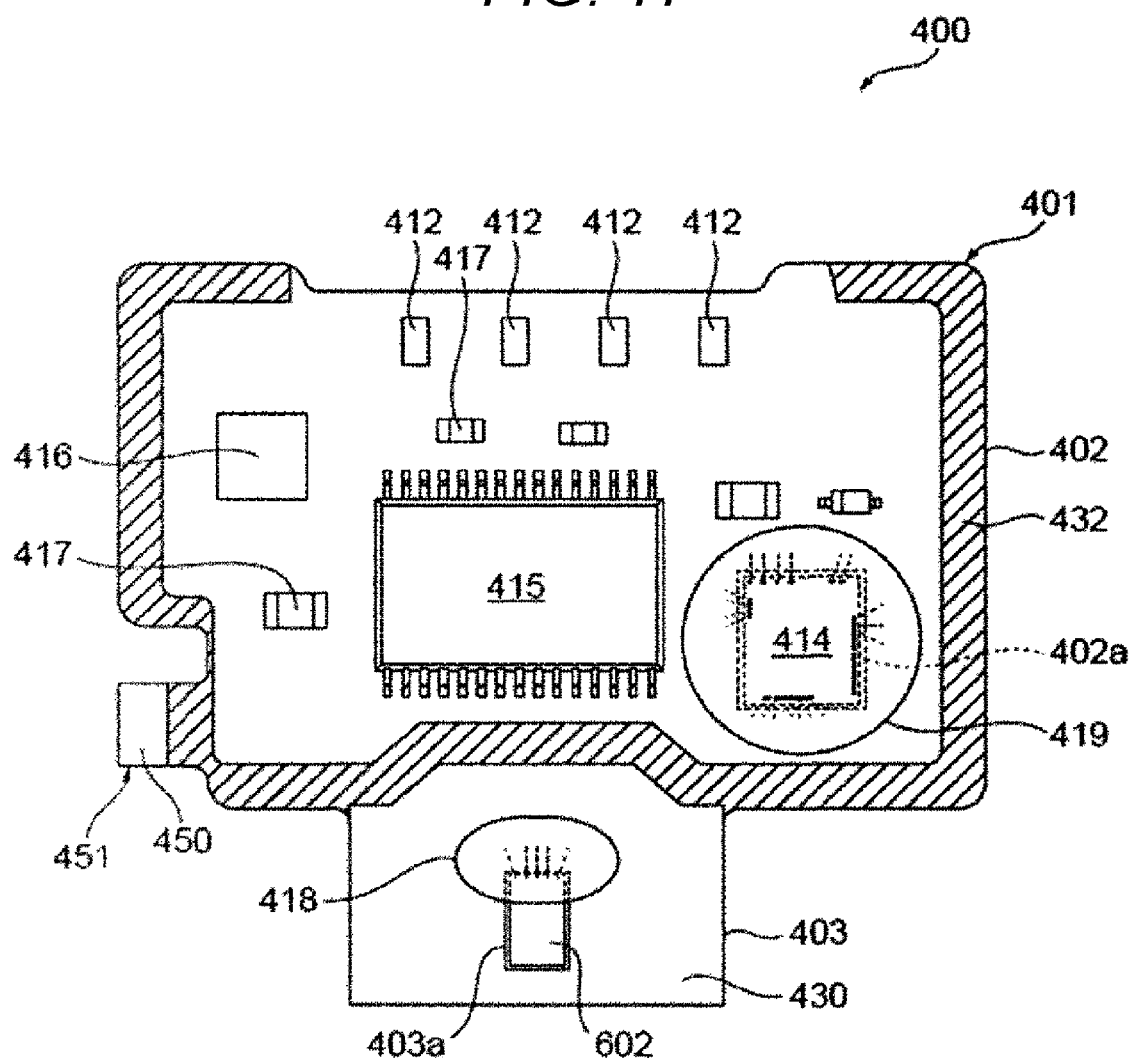
FIG. 17 is a front view of a circuit board.
Figure 18:
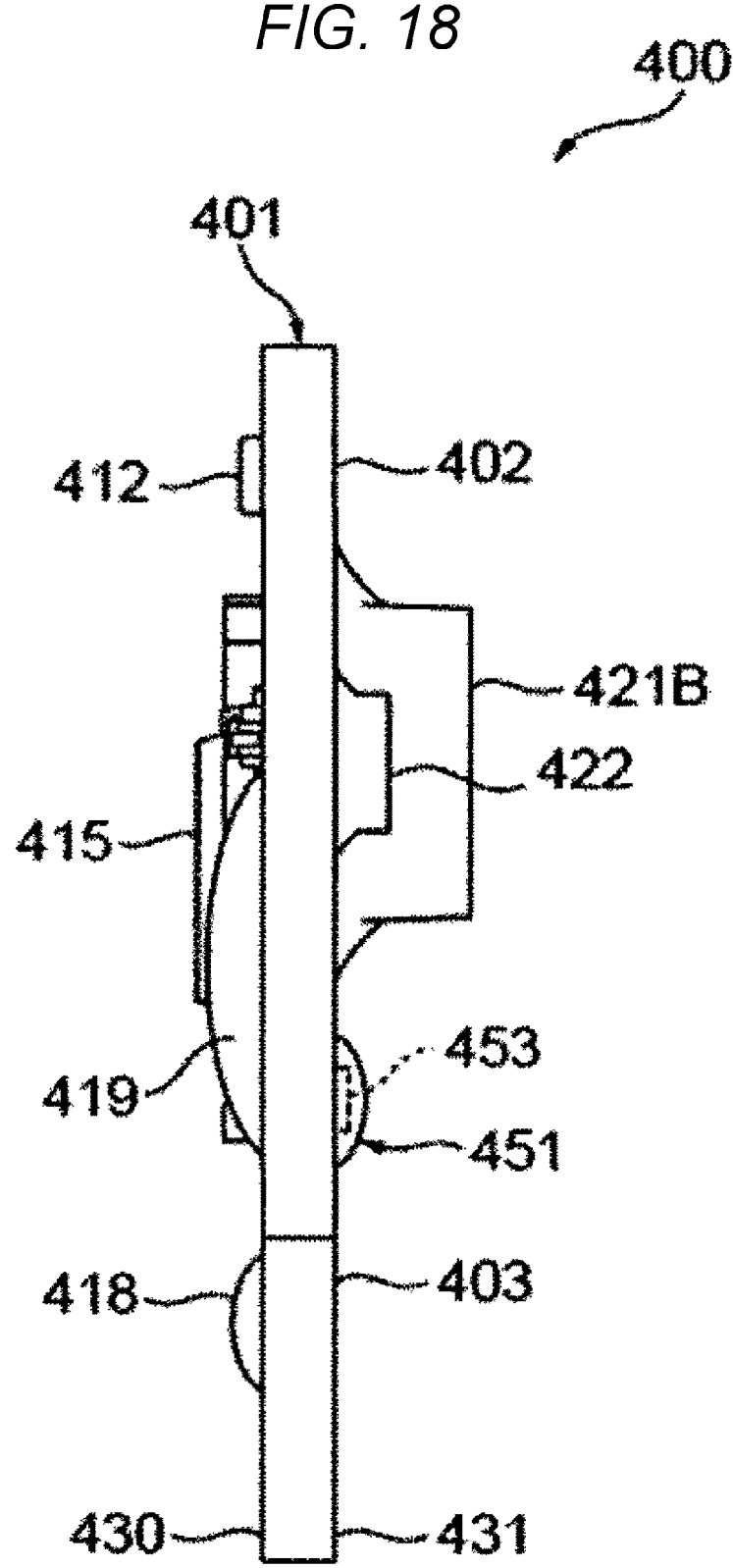
FIG. 18 is a right side view of a circuit board.
Figure 19:
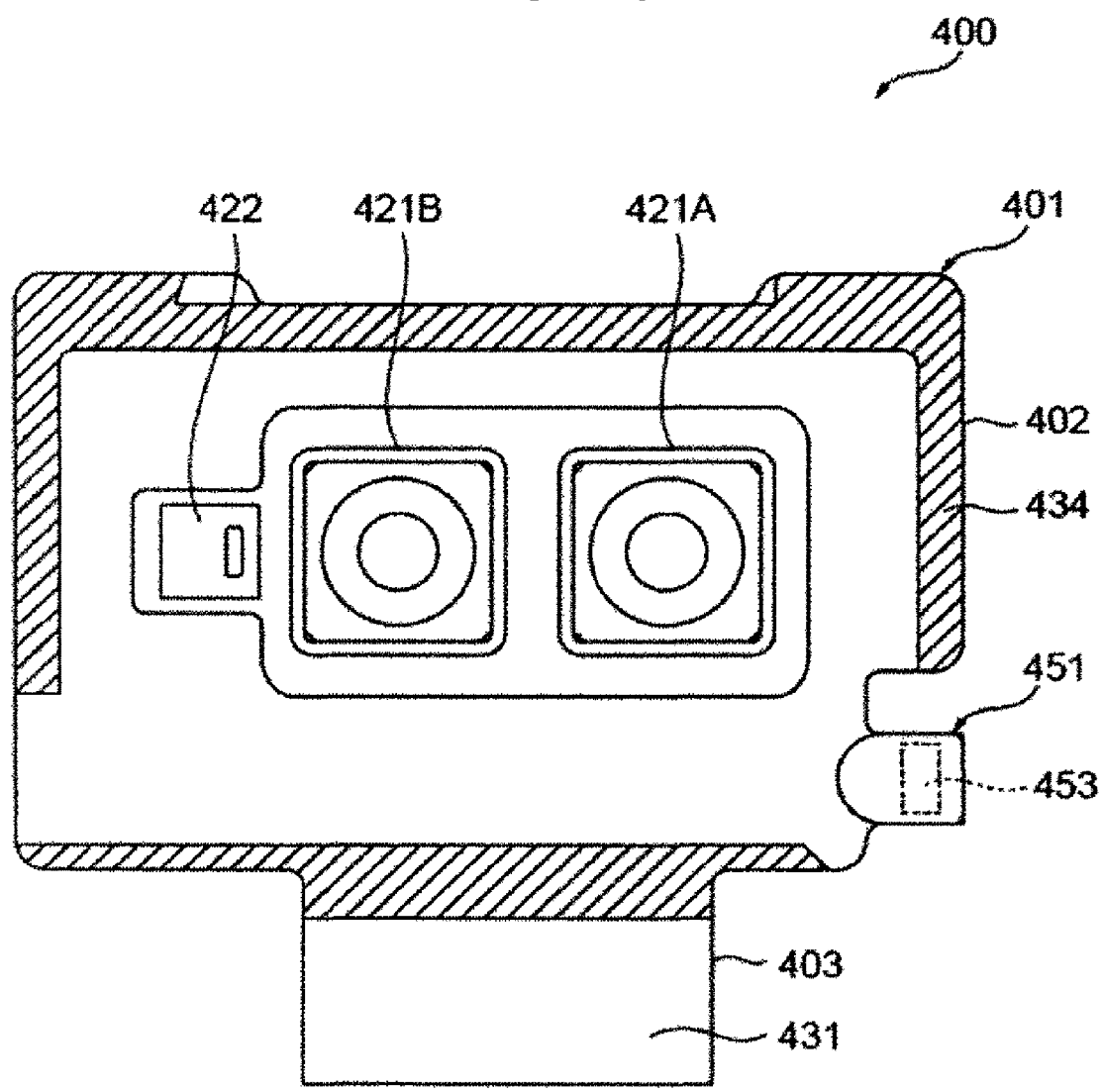
FIG. 19 is a rear view of a circuit board.

FIGS. 17 to 19 show an appearance of the circuit board 400. A hatched portion displayed on the appearance of the circuit board 400 shows a fixing surface 432 and a fixing surface 434 where the circuit board 400 is covered and fixed by the resin at the time of molding the housing 302 in the resin molding process.

FIG. 17 is a front view of the circuit board, FIG. 18 is a right side view of the circuit board, and FIG. 19 is a rear view of the circuit board.

The circuit board 400 has the board body 401, the circuit portion and the flow rate detection portion 602 to be a sensing element are provided on a surface of the board body 401, and the pressure sensor 421 and the humidity sensor 422 to be sensing elements are provided on a back surface of the board body 401. The board body 401 is configured using a material made of glass epoxy resin and has a value approximating to a thermal expansion coefficient of the thermoplastic resin forming the housing 302 as compared with a board of a ceramic material.

Therefore, when insert molding is performed on the housing 302, a stress due to a thermal expansion coefficient difference can be reduced and distortion of the circuit board 400 can be reduced.

The board body 401 has a flat plate shape having a constant thickness and has a substantially T shape in plan view, which has a substantially rectangular base portion 402 and a substantially rectangular protrusion portion 403 protruding from one side of the base portion 402 and smaller than the base portion 402. On the surface of the base portion 402, the circuit portion is provided. The circuit portion is configured by mounting electronic components such as an LSI 414, a microcomputer 415, a power supply regulator 416, and a chip component 417 such as a resistor and a capacitor on a circuit wiring line not shown in the drawings. The power supply regulator 416 has a larger calorific value than other electronic components such as the microcomputer 415 and the LSI 414, so that it is disposed at the relatively upstream side in the circuit chamber Rc. The entire LSI 414 is sealed with a synthetic resin material 419 so as to include gold wires, thereby improving a handling property of the circuit board 400 at the time of insert molding.

As shown in FIG. 17, a concave portion 402a into which the LSI 414 is fitted is formed in the surface of the board body 401. The concave portion 402a can be formed by performing laser processing on the board body 401. The board body 401 made of glass epoxy resin is easier to processing than a ceramic board body and the concave portion 402a can be easily provided. The concave portion 402a has a depth where the surface of the LSI 414 is flush with the surface of the board body 401. By matching the height of the surface of the LSI 414 with the height of the surface of the board body 401 as described above, wire bonding for connecting the LSI 414 and the board body 401 with the gold wires is facilitated and the circuit board 400 can be easily manufactured. For example, as shown in FIG. 17, the LSI 414 can be provided directly on the surface of the board body 401. In the case of the above structure, the synthetic resin material 419 covering the LSI 414 protrudes more largely. However, processing for forming the concave portion 402 in the board body 401 becomes unnecessary and manufacturing can be simplified.

When the circuit board 400 is insert-molded in the housing 302, the protrusion portion 403 is disposed in the first sub-passage 305 and the measurement flow passage surface 430 to be the surface of the protrusion portion 403 extends along a flow direction of the measured gas 30. On the measurement flow passage surface 430 of the protrusion portion 403, the flow rate detection portion 602 is provided. The flow rate detection portion 602 performs heat transfer with the measured gas 30, measures the state of the measured gas 30, for example, the flow rate of the measured gas 30, and outputs an electrical signal representing the flow rate flowing through the main passage 124. In order to measure the state of the measured gas 30 by the flow rate detection portion 602 with high accuracy, it is desirable that the gas flowing in the vicinity of the measurement flow passage surface 430 is a laminar flow and disturbance is small. Therefore, it is desirable that the surface of the flow rate detection portion 602 and the surface of the measurement flow passage surface 430 are flush with each other or a difference is a predetermined value or less.

As shown in FIG. 17, a concave portion 403a is provided in the surface of the measurement flow passage surface 430 and the flow rate detection portion 602 is fitted therein. The concave portion 403a can also be formed by performing laser processing. The concave portion 403a has a depth where the surface of the flow rate detection portion 602 is flush with the surface of the measurement flow passage surface 430. The flow rate detection portion 602 and a wiring portion thereof are covered with a synthetic resin material 418 to prevent electrolytic corrosion from occurring due to adhesion of salt water.

As shown in FIG. 19, the two pressure sensors 421A and 421B and one humidity sensor 422 are provided on the back surface of the board body 401. The two pressure sensors 421A and 421B are divided into the upstream side and the downstream side and are disposed in a row. In addition, the humidity sensor 422 is disposed on the downstream side of the pressure sensor 421B. The two pressure sensors 421A and 421B and one humidity sensor 422 are disposed in the sensor chamber Rs.

In the circuit board 400, the second sub-passage 306 is disposed on the back surface side of the board body 401. Therefore, it is possible to cool the entire board body 401 with the measured gas 30 passing through the second sub-passage 306.

4.2 Structure of Temperature Detection Portion 451

As shown in FIGS. 17 and 18, a temperature detection portion 451 is provided at an edge of the upstream side of the base portion 402 and in a corner portion of the side of the protrusion portion 403. The temperature detection portion 451 constitutes one of detection portions for detecting the physical quantity of the measured gas 30 flowing through the main passage 124 and is provided in the circuit board 400.

The circuit board 400 has a protrusion portion 450 protruding from the second sub-passage inlet 306a of the second sub-passage 306 to the upstream side of the measured gas 30 and the temperature detection portion 451 has a chip type temperature sensor 453 provided on the back surface of the circuit board 400 at the protrusion portion 450. The temperature sensor 453 and a wiring portion thereof are covered with a synthetic resin material to prevent electrolytic corrosion from occurring due to adhesion of salt water.

For example, as shown in FIG. 9, in the center portion of the measurement portion 331 provided with the second sub-passage inlet 306a, the upstream side outer wall 336 in the measurement portion 331 constituting the housing 302 is recessed toward the downstream side and the protrusion portion 450 (shown in FIG. 17) of the circuit board 400 protrudes to the upstream side from the upstream side outer wall 336 having the recess shape. The leading end of the protrusion portion 450 is disposed at a position recessed from the surface of the most upstream side of the upstream side outer wall 336. The temperature detection portion 451 is provided in the protrusion portion 450 so as to face the back surface of the circuit board 400, that is, the side of the second sub-passage 306.

Since the second sub-passage inlet 306a is formed on the downstream side of the temperature detection portion 451, the measured gas 30 flowing from the second sub-passage inlet 306a into the second sub-passage 306 contacts the temperature detection portion 451 and flows into the second sub-passage inlet 306a. When the measured gas 30 contacts the temperature detection portion 451, the temperature is detected. The measured gas 30 that contacts the temperature detection portion 451 flows from the second sub-passage inlet 306a into the second sub-passage 306, passes through the second sub-passage 306, and is discharged from the second sub-passage outlet 306b to the main passage 123.

4.4 Fixing of Circuit Board 400 by Resin Molding Process and Effect Thereof

A hatched portion in FIG. 19 shows the fixing surface 432 (FIG. 17) and the fixing surface 434 for covering the circuit board 400 with the thermoplastic resin used in the resin molding process in order to fix the circuit board 400 to the housing 302 in the resin molding process. It is important to maintain a relation between the measurement flow passage surface 430 and the flow rate detection portion 602 provided in the measurement flow passage surface 430 and the shape of the sub-passage with high accuracy to become a prescribed relation.

In the resin molding process, since the circuit board 400 is fixed to the housing 302 forming the sub-passage at the same time as forming the sub-passage, it is possible to maintain a relation between the sub-passage and the measurement flow passage surface 430 and the flow rate detection portion 602 with extremely high accuracy. That is, since the circuit board 400 is fixed to the housing 302 in the resin molding process, it is possible to position and fix the circuit board 400 with high accuracy in a mold for molding the housing 302 including the sub-passage. By injecting the thermoplastic resin of the high temperature into the mold, the sub-passage is molded with high accuracy and the circuit board 400 is fixed with high accuracy.

Therefore, errors and variations occurring in each circuit board 400 can be suppressed to very small values. As a result, measurement accuracy of the circuit board 400 can be greatly improved.

5. Circuit Configuration of Air Flow Rate Measurement Device 300

5.1 Entire Circuit Configuration of Air Flow Rate Measurement Device 300

Figure 20:
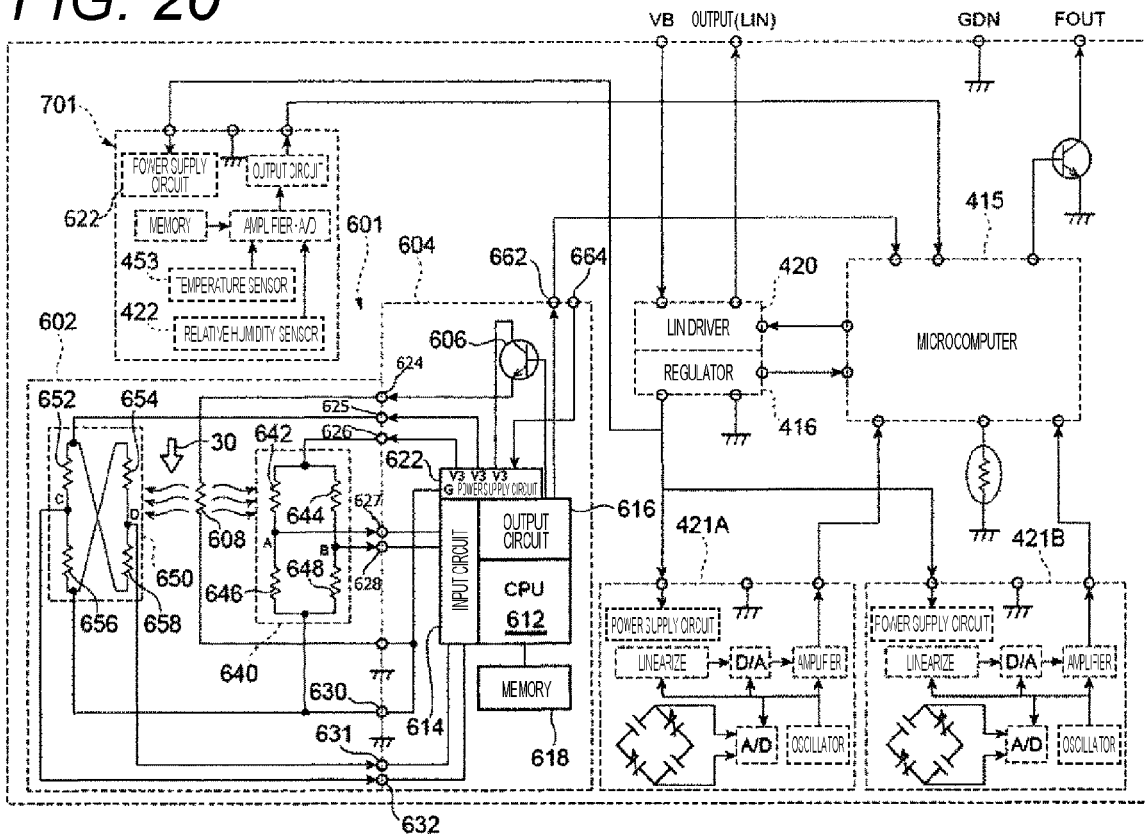
FIG. 20 is a circuit diagram of an air flow rate measurement device.

FIG. 20 is a circuit diagram of the air flow rate measurement device 300. The air flow rate measurement device 300 has a flow rate detection circuit 601 and a temperature/humidity detection circuit 701.

The flow rate detection circuit 601 includes a flow rate detection portion 602 having a heating element 608 and a processing portion 604. The processing portion 604 controls a quantity of heat generated by the heating element 608 of the flow rate detection portion 602 and outputs a signal representing the flow rate to the microcomputer 415 via a terminal 662 on the basis of an output of the flow rate detection portion 602.

In order to perform the above processing, the processing portion 604 includes a central processing unit (hereinafter, referred to as a CPU) 612, an input circuit 614, an output circuit 616, a memory 618 for holding data representing a relation between a correction value or a measurement value and the flow rate, and a power supply circuit 622 for supplying a constant voltage to each necessary circuit. DC power is supplied to the power supply circuit 622 from an external power supply such as an in-vehicle battery via a terminal 664 and a ground terminal not shown in the drawings.

The flow rate detection portion 602 is provided with the heating element 608 for heating the measured gas 30. A voltage V1 is supplied from the power supply circuit 622 to a collector of a transistor 606 constituting a current supply circuit of the heating element 608, a control signal is applied from the CPU 612 to a base of the transistor 606 via the output circuit 616, and a current is supplied from the transistor 606 to the heating element 608 via a terminal 624 on the basis of the control signal. A quantity of current supplied to the heating element 608 is controlled by the control signal applied from the CPU 612 to the transistor 606 constituting the current supply circuit of the heating element 608 via the output circuit 616.

The processing portion 604 controls the quantity of heat generated by the heating element 608 so that the temperature of the measured gas 30 becomes higher than the initial temperature by a predetermined temperature, for example, 100° C. by heating by the heating element 608.

The flow rate detection portion 602 has a heat generation control bridge 640 for controlling the quantity of heat generated by the heating element 608 and a flow rate detection bridge 650 for measuring the flow rate. A constant voltage V3 is supplied from the power supply circuit 622 to one end of the heat generation control bridge 640 via a terminal 626 and the other end of the heat generation control bridge 640 is connected to the ground terminal 630. Further, the constant voltage V3 is supplied from the power supply circuit 622 to one end of the flow rate detection bridge 650 via a terminal 625 and the other end of the flow rate detection bridge 650 is connected to the ground terminal 630.

The heat generation control bridge 640 has a resistor 642 to be a resistance temperature detector whose resistance value changes on the basis of the temperature of the heated measured gas 30 and the resistor 642, a resistor 644, a resistor 646, and a resistor 648 constitute a bridge circuit. A potential difference between an intersection A of the resistor 642 and the resistor 646 and an intersection B of the resistor 644 and the resistor 648 is input to the input circuit 614 via a terminal 627 and a terminal 628. The CPU 612 controls the quantity of heat generated by the heating element 608 by controlling the current supplied from the transistor 606 so that the potential difference between the intersection A and the intersection B becomes a predetermined value, in this embodiment, a zero volt.

The flow rate detection circuit 601 shown in FIG. 20 heats the measured gas 30 with the heating element 608 so that the temperature becomes higher than the original temperature of the measured gas 30 by a constant temperature, for example, 100° C. at all times. In order to perform the heating control with high accuracy, when the temperature of the measured gas 30 heated with the heating element 608 becomes higher than the initial temperature by the constant temperature, for example, 100° C. at all times, a resistance value of each resistor constituting the heat generation control bridge 640 is set so that the potential difference between the intersection A and the intersection B becomes a zero volt. Therefore, in the flow rate detection circuit 601, the CPU 612 controls the current supplied to the heating element 608 so that the potential difference between the intersection A and the intersection B becomes a zero volt.

The flow rate detection bridge 650 includes four resistance temperature detectors of a resistor 652, a resistor 654, a resistor 656, and a resistor 658. These four resistance temperature detectors are disposed along the flow of the measured gas 30, the resistor 652 and the resistor 654 are re disposed on the upstream side of the flow passage of the measured gas 30 with respect to the heating element 608, and the resistor 656 and the resistor 658 are disposed on the downstream side of the flow passage of the measured gas 30 with respect to the heating element 608. In order to improve the measurement accuracy, the resistor 652 and the resistor 654 are disposed so that the distances to the heating element 608 are substantially the same and the resistor 656 and the resistor 658 are disposed so that the distances to the heating element 608 are substantially the same.

A potential difference between an intersection C of the resistor 652 and the resistor 656 and an intersection D of the resistor 654 and the resistor 658 is input to the input circuit 614 via a terminal 631 and a terminal 632. In order to improve the measurement accuracy, for example, each resistance of the flow rate detection bridge 650 is set so that the potential difference between the intersection C and the intersection D becomes zero in a state where the flow of the measured gas 30 is zero, for example. Therefore, in a state where the potential difference between the intersection C and the intersection D is, for example, a zero volt, the CPU 612 outputs an electrical signal showing that the flow rate of the main passage 124 is zero from the terminal 662, on the basis of a measurement result showing that the flow rate of the measured gas 30 is zero.

When the measured gas 30 flows in a direction of an arrow in FIG. 20, the resistor 652 and the resistor 654 disposed on the upstream side are cooled by the measured gas 30, the resistor 656 and the resistor 658 disposed on the downstream side of the measured gas 30 are warmed by the measured gas 30 warmed by the heating element 608, and the temperatures of the resistor 656 and the resistor 658 increase. Therefore, the potential difference occurs between the intersection C and the intersection D of the flow rate detection bridge 650 and the potential difference is input to the input circuit 614 via the terminal 631 and the terminal 632. The CPU 612 searches for data representing a relation between the potential difference stored in the memory 618 and the flow rate of the main passage 124, on the basis of the potential difference between the intersection C and the intersection D of the flow rate detection bridge 650, and obtains the flow rate of the main passage 124.

An electrical signal representing the flow rate of the main passage 124 obtained as described above is output via the terminal 662. Although reference numerals are newly written to the terminal 664 and the terminal 662 shown in FIG. 20, the terminals are included in the connection terminal 412 shown in FIG. 17 described above.

Data representing a relation between the potential difference between the intersection C and the intersection D and the flow rate of the main passage 124 is stored in the memory 618. After the circuit board 400 is produced, correction data for reducing measurement errors such as variations, obtained on the basis of an actual measurement value of the gas, is stored in the memory.

The temperature/humidity detection circuit 701 includes an input circuit such as an amplifier·A/D for inputting detection signals from the temperature sensor 453 and the humidity sensor 422, an output circuit, a memory holding data representing a relation between the correction value or the temperature and the absolute humidity, and a power supply circuit 622 for supplying a constant voltage to each necessary circuit. Signals output from the flow rate detection circuit 601 and the temperature/humidity detection circuit 701 are input to the microcomputer 415. The microcomputer 415 has a flow rate calculation portion, a temperature calculation portion, and an absolute humidity calculation portion, calculates the flow rate, the temperature, and the absolute humidity to be the physical quantities of the measured gas 30 on the basis of the signals, and outputs them to an ECU 200.

The air flow rate measurement device 300 and the control device (ECU) 200 are connected by a communication cable and communication using a digital signal is performed according to the communication standard such as SENT, LIN, and CAN. In the present embodiment, a signal is input from the microcomputer 415 to an LIN driver 420 and LIN communication is performed from the LIN driver 420. Information output from the LIN driver 420 of the air flow rate measurement device 300 to the control device (ECU) 200 is superimposed and output by digital communication using a single or two-wire communication cable.

The absolute humidity calculation portion of the microcomputer 415 performs processing for calculating the absolute humidity on the basis of information of the relative humidity output from the relative humidity sensor 422 and temperature information and correcting the absolute humidity on the basis of errors. The corrected absolute humidity calculated by the absolute humidity calculation portion is used for various engine operation control by the control device 200 to be the ECU. Further, the control device 200 can directly use information of the total errors for the various engine operation control.

Figure 21:
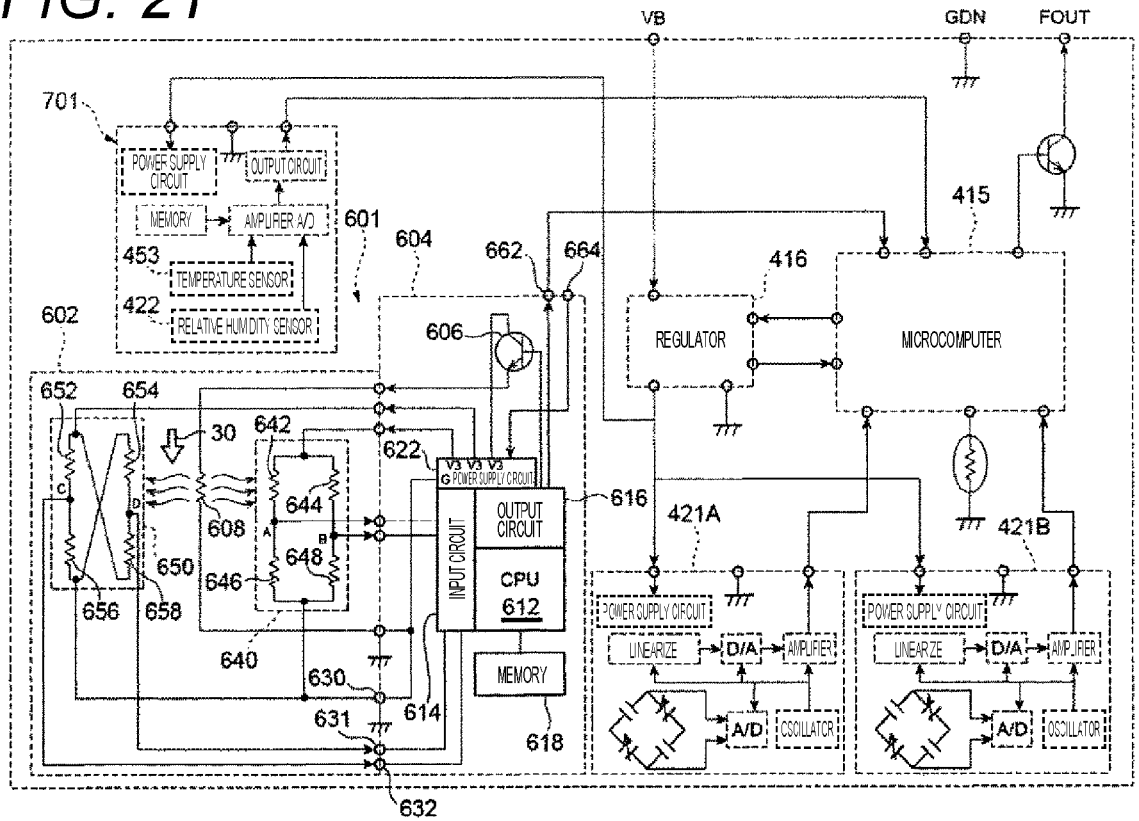
FIG. 21 is a diagram showing another example of a circuit configuration of an air flow rate measurement device.

In the embodiment shown in FIG. 20 described above, the case where the air flow rate measurement device 300 has the LIN driver 420 and performs the LIN communication has been described. However, the present invention is not limited thereto. As shown in FIG. 21, although the air flow rate measurement device has the regulator 416, the air flow rate measurement device may perform direct communication with the microcomputer 415 without using the LIN communication.

6. Structure of Circuit Board 400

Figure 22:
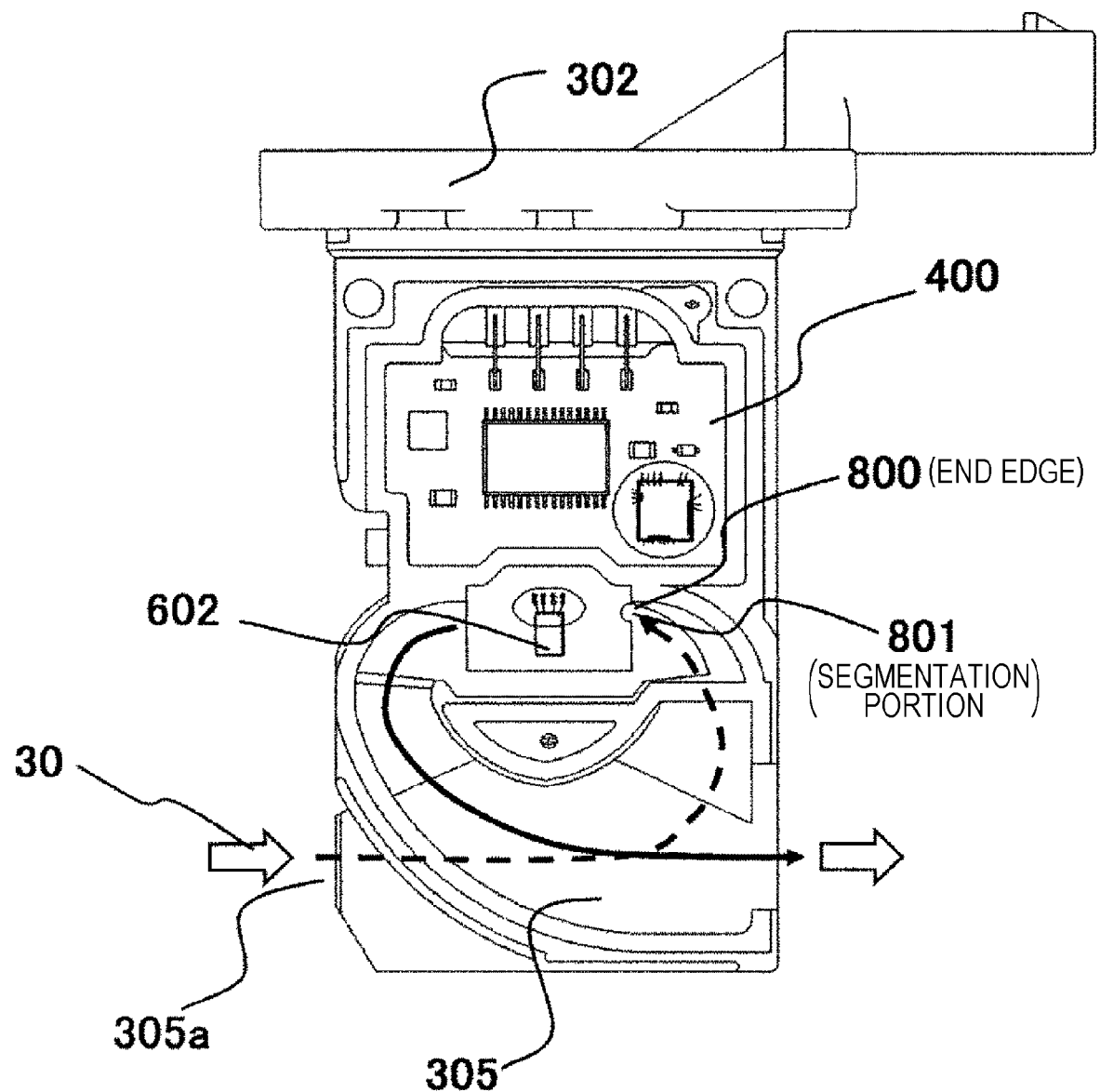
FIG. 22 is a front view showing a shape of a housing in which a front cover is removed from an air flow rate measurement device.

FIG. 22 is a front view showing a shape of the housing 302 in which the front cover 303 is removed from the air flow rate measurement device 300.

The measured gas 30 flowing from the inlet 305a of the sub-passage 305 of the housing 302 may include water droplets and the measured gas 30 passes through the sub-passage 305 and arrives at the flow rate detection portion 602, together with the water droplets. The flow rate detection portion 602 has a heat generation control bridge for controlling the quantity of heat generated by the heating element and a flow rate detection bridge for measuring the flow rate. For this reason, if the waterdrops adhere, there is a problem in that a bridge balance collapses and characteristics vary.

When there are few water droplets arriving at the flow rate detection portion 602, output noise occurs. When there are many water droplets arriving at the flow rate detection portion 602, a deviation occurs between a detected flow rate and an actual flow rate, so that flow rate detection accuracy is deteriorated.

In a portion of the edge 800 of the circuit board 400 on which the flow rate detection portion 602 is mounted, at the side where the measured gas 30 arrives before the flow rate detection portion 602, a segmentation portion 801 for segmenting the edge 800 is formed. The measured gas 30 that has passed through the sub-passage 305 can flow the water droplets flowed with the measured gas 30 in a direction distant from the flow rate detection portion 602 by vortices generated by the segmentation portion 801 and can suppress the quantity of water droplets arriving at the flow rate detection portion 602.

If the water droplets flow from the inlet 305a of the sub-passage 305 of the housing 302, the water droplets are concentrated on the edge 800 of the outer circumference of the circuit board 400 and the sub-passage 305 through the outer wall of the sub-passage 305. When the segmentation portion 801 is not formed, the water droplets concentrated on the edge 800 become large water droplets and flow to the flow rate detection portion 602. When the segmentation portion 801 is formed in the edge 800, the water droplets that have arrived at the circuit board 400 flow in a direction distant from the flow rate detection portion 602 due to the vortices generated by the segmentation portion 801 and the quantity of water droplets arriving at the flow rate detection portion 602 can be suppressed.

When the housing 302 is molded, the circuit board 400 is inserted into the housing 302 and fixed by the housing 302. By fixing the segmentation structure portion 801 formed in the circuit board 400 with the mold, the outer circumference of the sub-passage 305 and the edge of the segmentation structure 801 can be substantially matched, so that it is possible to flow the water droplets flowing with the measured gas 30 in a direction distant from the flow rate detection portion 602.

Figure 23:
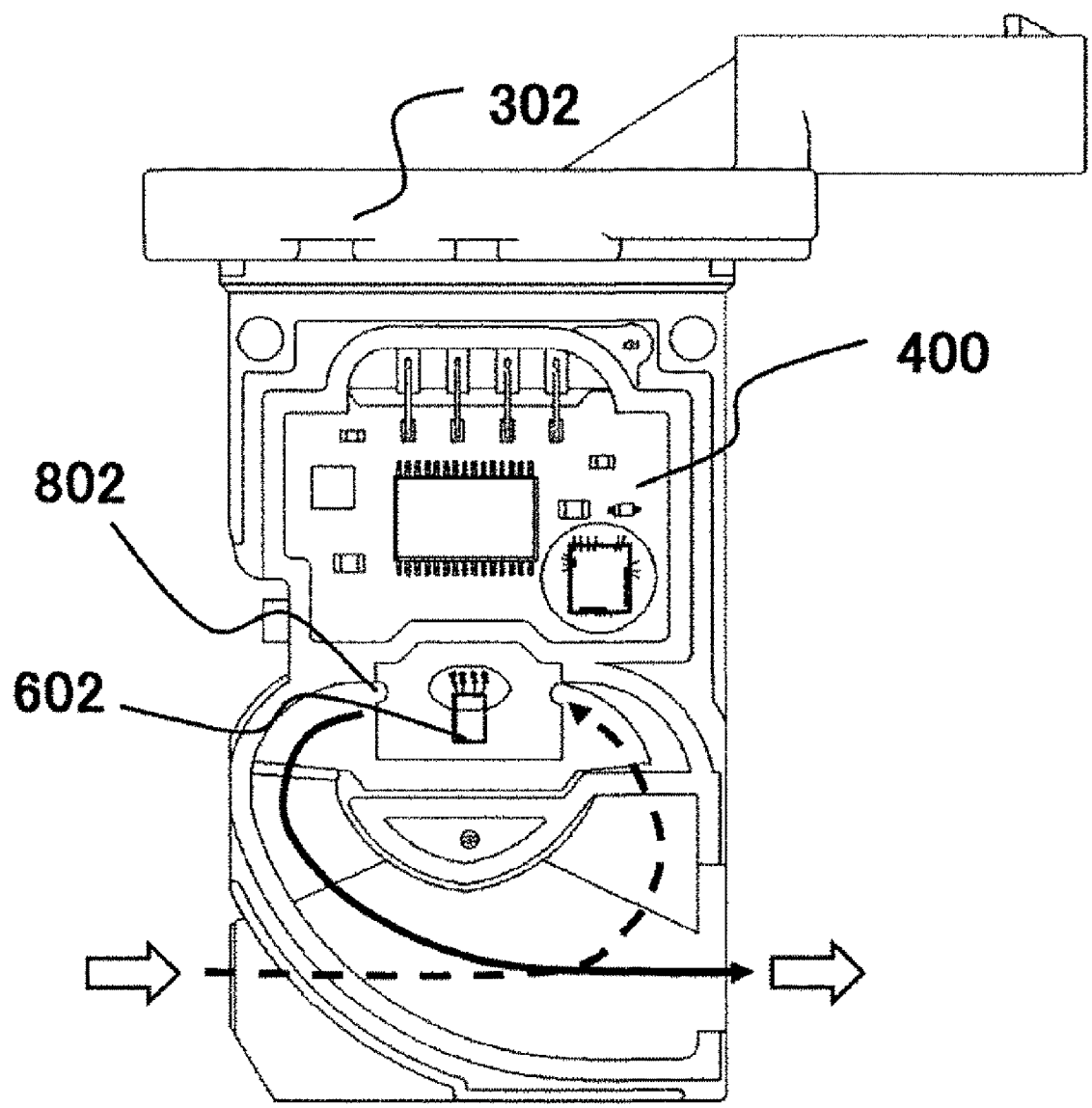
FIG. 23 is a diagram showing a modification of an example shown in FIG. 22.

FIG. 23 is a front view showing a shape of the housing 302 in which the front cover 304 is removed from the physical quantity detection device 300 and is a diagram showing a modification of the example shown in FIG. 22.

In FIG. 23, in addition to the segmentation portion 801 shown in FIG. 22, a segmentation portion 802 for segmenting an edge of the downstream side of the circuit board 400 on which the flow rate detection portion 602 is mounted is formed. Depending on the internal combustion engine to be mounted, the air flow rate measurement device 300 may have a large quantity of blowback from the internal combustion engine and the water droplets may be included in the blowback. For this reason, by forming the segmentation portion 802 on the downstream side, output noise and output deviation can be suppressed. The segmentation portions 801 and 802 can be defined as water droplet capture portions.

Figure 24:
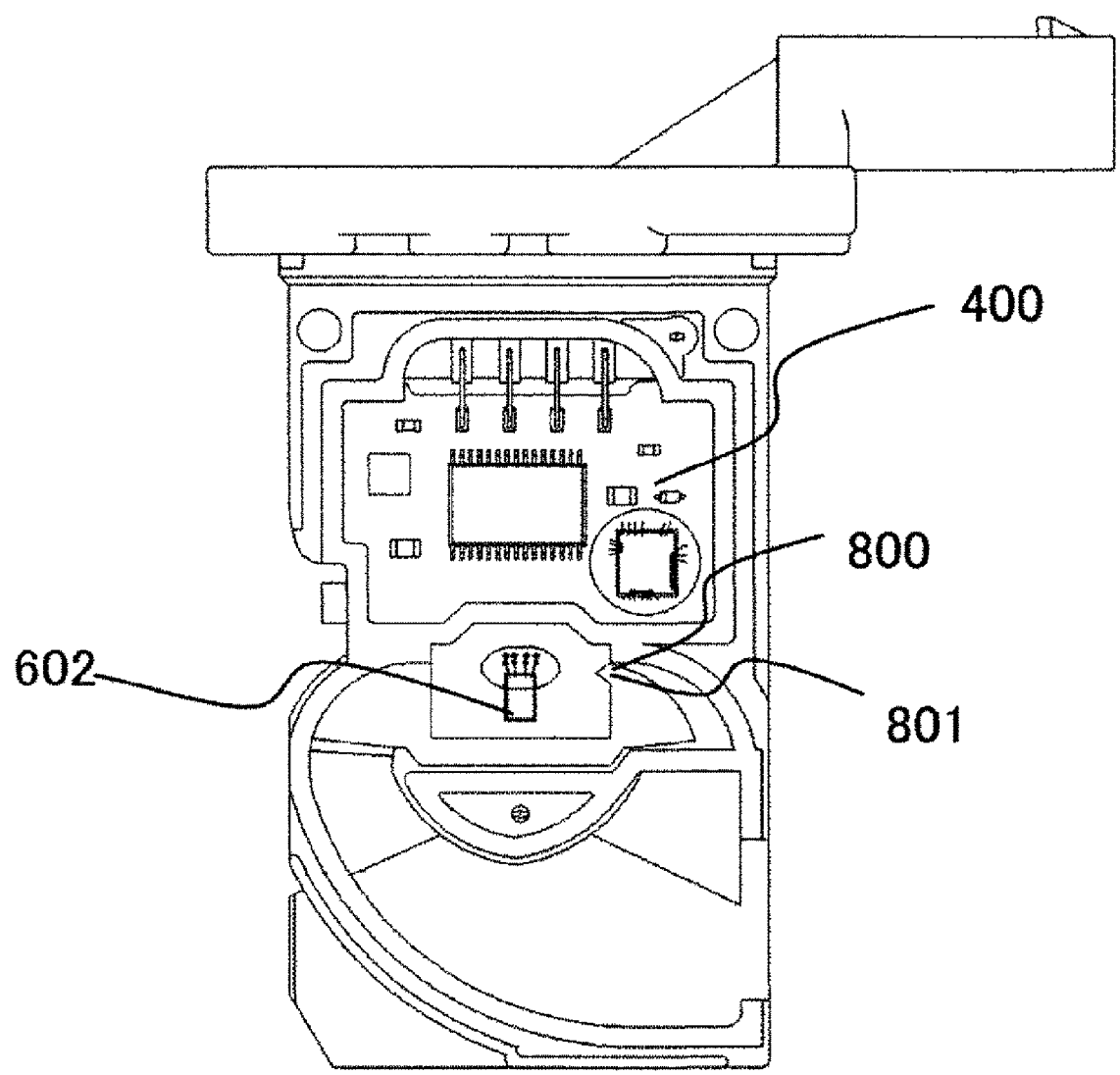
FIG. 24 is a diagram showing a modification of a shape of a segmentation portion.
Figure 25:
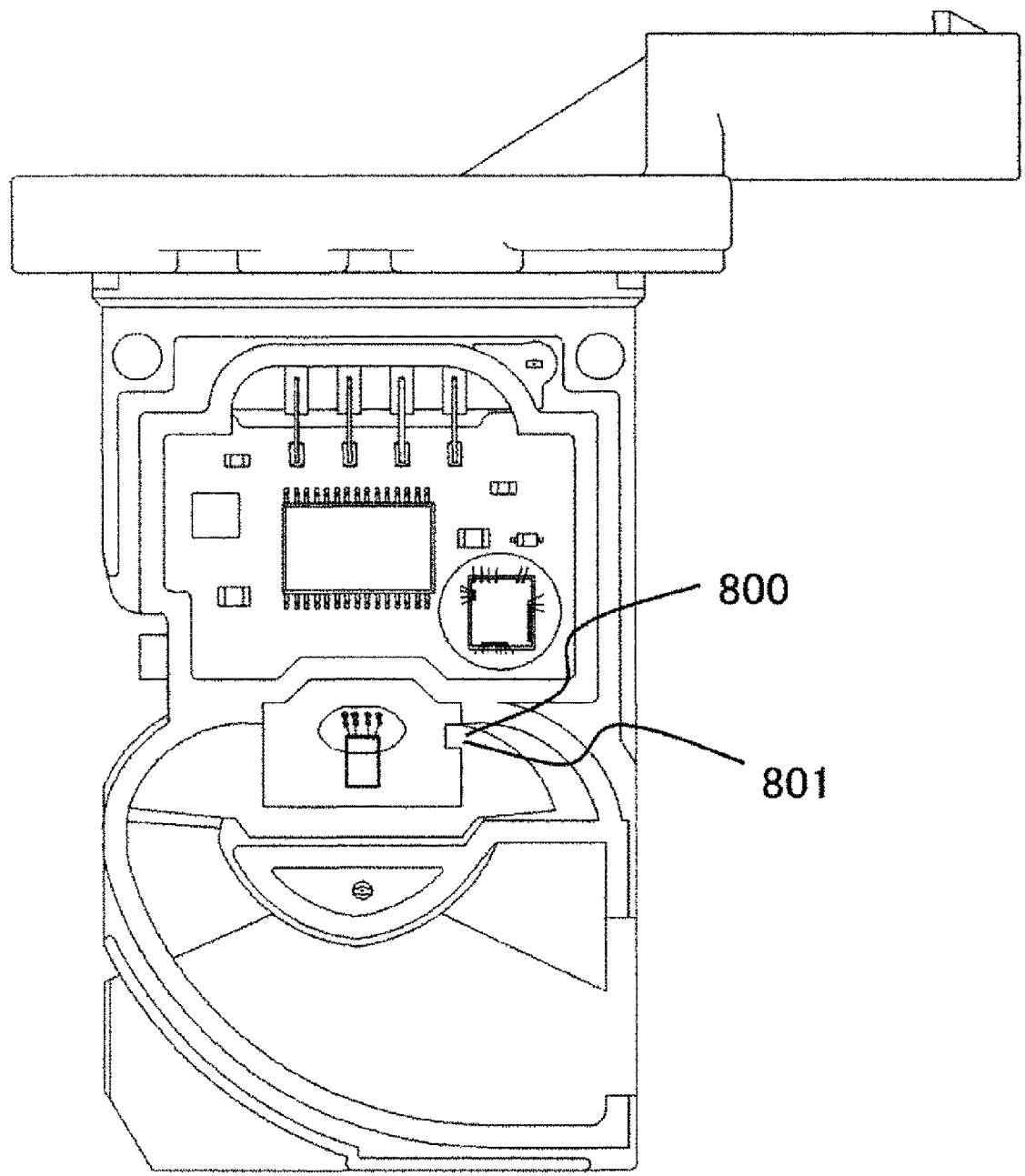
FIG. 25 is a diagram showing a modification of a shape of a segmentation portion.
Figure 26:
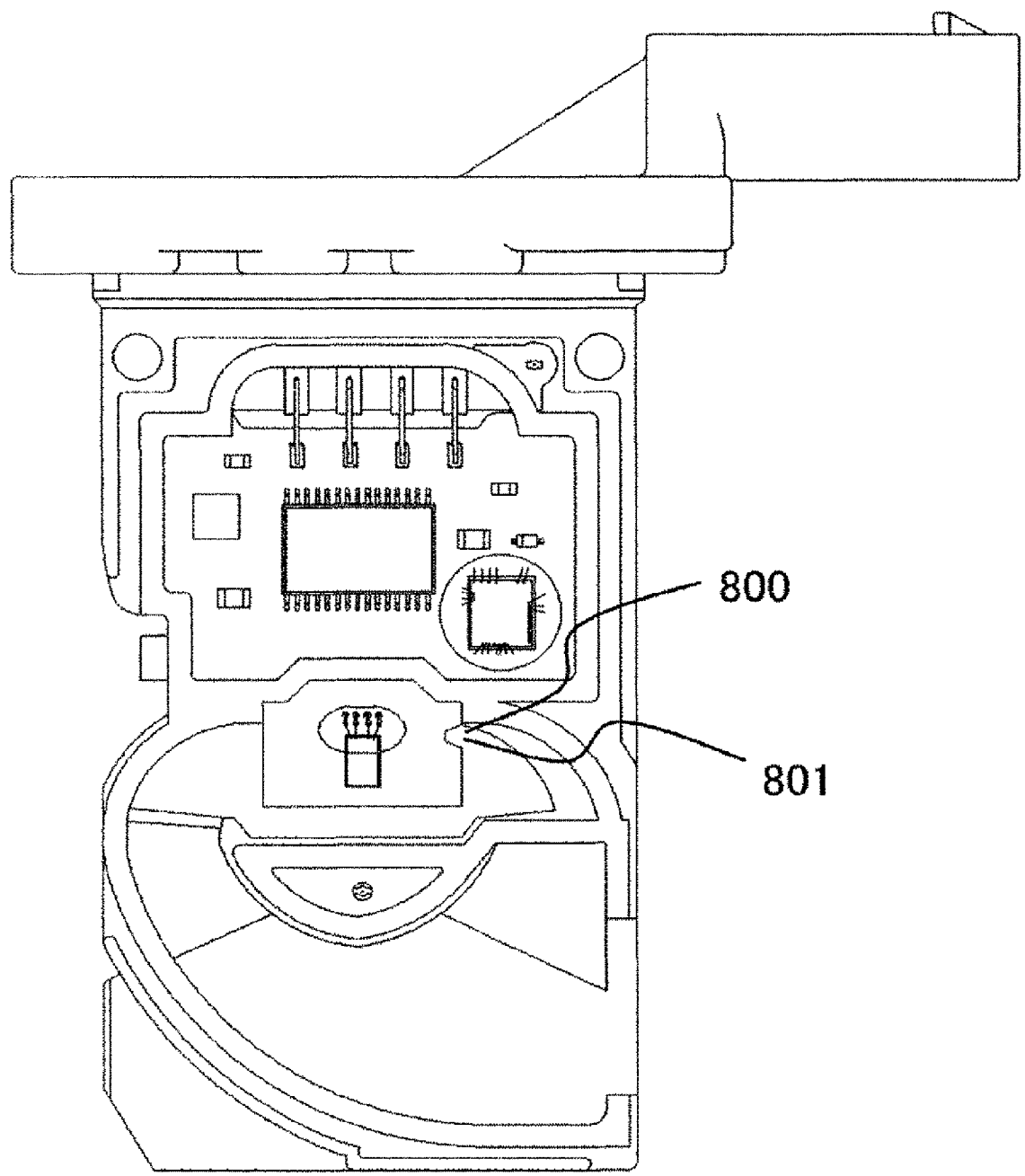
FIG. 26 is a diagram showing a modification of a shape of a segmentation portion.

FIGS. 24 to 26 are diagrams showing modifications of the shape of the segmentation portion 801. The segmentation portion 801 is not limited to the semicircular shape shown in FIGS. 22 and 23 and may have a polygonal shape such as a triangular shape, a rectangular shape, and a pentagonal shape. If the segmentation portion 801 exists in the edge 800, the water droplets that have arrived at the circuit board 400 flow in a direction distant from the flow rate detection portion 602 due to the vortices generated by the segmentation portion 801 and can suppress the quantity of water droplets arriving at the flow rate detection portion 602.

As shown in FIG. 23, these triangular, rectangular, and polygonal segmentation portions can be formed on the upstream side and the downstream side.

As described above, according to the embodiment of the present invention, since the segmentation portion 801 to be the semicircular notch structure for segmenting the edge 800 is formed in the edge 800 of the upstream side through which the air flows in the circuit board 400 on which the flow rate detection portion 602 is mounted, it is possible to suppress the water droplets arriving at the flow rate detection portion 602 by capturing the water droplets flowing with the measured gas 30 by the segmentation portion 801.

That is, it is possible to realize the air flow rate measurement device capable of suppressing disturbance of the flow of the measured gas and reducing the characteristic influence by the water droplets flowing with the intake air.

For example, if a lateral width of the board on which the flow rate detection portion 602 is mounted is about 10.8 mm, the segmentation portion 801 may be a semicircular notch having a radius of about 1, 5 mm and the disturbance of the flow of the measured gas 30 can also be suppressed. Furthermore, in the case of the semicircular notch, a radius thereof can be a dimension from about 0.5 mm to a longitudinal limit point of the leading end portion of the circuit board 400.

The example where the circuit board 400 is molded integrally with the housing 302 (an example of being integrally molded) has been described. However, the circuit board 400 and the housing 302 may not be formed integrally but may be formed separately.

Further, the segmentation portion 801 has been formed in the vicinity of the boundary portion between the wall surface of the housing 302 forming the first sub-passage 305 and the edge of the board 400. However, the segmentation portion 801 may be formed near the center of the end portion 800 of the board 400 or may be formed on the leading end side.

Further, as long as a shape is a shape in which the water droplets flowing through the first sub-passage 305 are distant from the flow rate detection portion 602, the segmentation portion 801 may have a shape other than the above-described shape, such as a groove and a plurality of concave portions formed in an end face of the board 400.

REFERENCE SIGNS LIST 30 measured gas
124 main passage
300 air flow rate measurement device
302 housing
305 first sub-passage
400 circuit board
337 through-hole
421A, 421B pressure sensor
422 humidity sensor
602 flow rate detection portion
801 segmentation portion

The invention claimed is:

1. An air flow rate measurement device, comprising:
a board which has a flow rate detection portion to detect a flow rate of measured gas; and
a housing which is provided with a passage taking a part of the measured gas and fixes the board so that the flow rate detection portion is disposed in the passage;
wherein the board has a segmentation portion which is provided in an edge of the upstream side of a flow of the measured gas with respect to the flow rate detection portion and segments a part of the edge;
wherein the segmentation portion includes a notch formed at a boundary portion between a wall surface of the housing forming the passage and the edge of the board; and
wherein the notch is configured to capture water droplets flowing through the passage.

2. The air flow rate measurement device according to claim 1, wherein the segmentation portion is formed at a position where water is concentrated, at the upstream side of the flow of the measured gas.

3. The air flow rate measurement device according to claim 2, wherein the segmentation portion has a shape in which water droplets flowing through the passage are distant from the flow rate detection portion.

4. The air flow rate measurement device according to claim 1, wherein the notch is also formed at an edge of a downstream side of the flow of the measured gas with respect to the flow rate detection portion.

5. The air flow rate measurement device according to claim 1, wherein the notch has a semicircular shape.

6. The air flow rate measurement device according to claim 5, wherein a radius of the notch is based on a lateral width of the board.

7. The air flow rate measurement device according to claim 5, wherein a radius of the notch is based on a longitudinal limit point of a leading end portion of the board.

8. The air flow rate measurement device according to claim 1, wherein the notch has a triangular shape.

9. The air flow rate measurement device according to claim 1, wherein the notch has a rectangular shape.

10. The air flow rate measurement device according to claim 1, wherein the notch has a polygonal shape of at least a pentagon.

11. The air flow rate measurement device according to claim 1, wherein the board is fixed to the housing by integral molding.

* * * * *